US012695635B2

(12) United States Patent　　　(10) Patent No.:　US 12,695,635 B2
Wright et al.　　　　　　　　　　　(45) Date of Patent:　　　Jul. 28, 2026

(54) SYSTEM AND METHOD FOR CONTROLLING ASSET-RELATED ACTIONS VIA A BLOCK CHAIN

(71) Applicant: nChain Licensing AG, Zug (CH)

(72) Inventors: Craig Steven Wright, London (GB); Gavin Allen, London (GB)

(73) Assignee: NCHAIN LICENSING AG, Zug (CH)

( * ) Notice:　Subject to any disclaimer, the term of this patent is extended or adjusted under 35 U.S.C. 154(b) by 343 days.

(21) Appl. No.: 18/110,139

(22) Filed:　　Feb. 15, 2023

(65)　　　　Prior Publication Data

US 2023/0254168 A1　　　Aug. 10, 2023

Related U.S. Application Data

(63) Continuation of application No. 16/079,089, filed as application No. PCT/IB2017/050824 on Feb. 14, 2017, now Pat. No. 11,606,219.

(30)　　　Foreign Application Priority Data

Feb. 23, 2016　(GB) ..................................... 1603114
Feb. 23, 2016　(GB) ..................................... 1603117
(Continued)

(51) Int. Cl.
　　H04L 9/00　　　　(2022.01)
　　G06Q 20/06　　　(2012.01)
　　　　　　　　(Continued)
(52) U.S. Cl.
　　CPC ........... H04L 9/50 (2022.05); G06Q 20/0658 (2013.01); G06Q 20/36 (2013.01);
　　　　　　　(Continued)

(58) Field of Classification Search
None
See application file for complete search history.

(56)　　　　　References Cited

U.S. PATENT DOCUMENTS 5,535,276　A　　7/1996　Ganesan
5,600,725　A　　2/1997　Rueppel et al.
　　　　　　(Continued)

FOREIGN PATENT DOCUMENTS

AU　　2016100059　A4　　3/2016
CA　　　2867765　A1　　4/2016
　　　　　　(Continued)

OTHER PUBLICATIONS

Poon et al.: "The Bitcoin Lightning Network: Scalable Off-Chain Instant Payments", Jan. 14 2016, Retrieved from the Internet: https://lightning.network/lightning-network-paper.pdf (Year: 2016).*
(Continued)

*Primary Examiner* — Patrick McAtee
*Assistant Examiner* — Jason B Fenstermacher
(74) *Attorney, Agent, or Firm* — Tarolli, Sundheim, Covell & Tummino LLP

(57)　　　　　　ABSTRACT

Presented herein are one or more embodiments with novel techniques of: defining an asset comprising at least one private cryptographic key, each private cryptographic key being associated with an owner of the asset; generating a registry comprising at least one public cryptographic key; generating a smart contract comprising at least one rule relating to an automated generation of one or more block-chain transactions to enable a transfer to be made in respect of the asset; and using a computing agent to evaluate and/or execute the at least one rule of the smart contract. Thus, one benefit provided by the invention is that it allows the secure distribution of costs and income for an asset registered and maintained on the Blockchain, which, in turn increases the (Continued)

capability of such assets to meet the real-world needs of various entities such as the asset itself and investing parties.

9 Claims, 16 Drawing Sheets

| (30) | Foreign Application Priority Data | | |
|---|---|---|---|
| Feb. 23, 2016 | (GB) | ...................................... | 1603123 |
| Mar. 11, 2016 | (GB) | ...................................... | 1604225 |
| Apr. 15, 2016 | (GB) | ...................................... | 1606630 |
| Nov. 15, 2016 | (GB) | ...................................... | 1619301 |

(51) Int. Cl.
| G06Q 20/36 | (2012.01) |
|---|---|
| G06Q 20/38 | (2012.01) |
| H04L 9/08 | (2006.01) |
| H04L 9/14 | (2006.01) |
| H04L 9/32 | (2006.01) |

(52) U.S. Cl.
CPC ....... *G06Q 20/3829* (2013.01); *H04L 9/0861* (2013.01); *H04L 9/14* (2013.01); *H04L 9/3239* (2013.01); *H04L 9/3247* (2013.01); *G06Q 2220/00* (2013.01); *H04L 2209/56* (2013.01)

(56) References Cited

U.S. PATENT DOCUMENTS

| 5,761,305 A | 6/1998 | Vanstone et al. |
|---|---|---|
| 5,867,578 A | 2/1999 | Brickell et al. |
| 5,889,865 A | 3/1999 | Vanstone et al. |
| 5,896,455 A | 4/1999 | Vanstone et al. |
| 5,920,630 A | 7/1999 | Wertheimer et al. |
| 5,933,504 A | 8/1999 | Vanstone et al. |
| 6,061,449 A | 5/2000 | Candelore et al. |
| 6,078,667 A | 6/2000 | Johnson |
| 6,118,874 A | 9/2000 | Okamoto et al. |
| 6,122,736 A | 9/2000 | Vanstone et al. |
| 6,141,420 A | 10/2000 | Vanstone et al. |
| 6,286,098 B1 | 9/2001 | Wenig et al. |
| 6,487,660 B1 | 11/2002 | Vanstone et al. |
| 6,490,352 B1 | 12/2002 | Schroeppel |
| 6,618,483 B1 | 9/2003 | Vanstone et al. |
| 6,662,299 B1 | 12/2003 | Price, III |
| 6,704,870 B2 | 3/2004 | Vanstone et al. |
| 6,785,813 B1 | 8/2004 | Vanstone et al. |
| 6,792,530 B1 | 9/2004 | Qu et al. |
| 6,819,766 B1 | 11/2004 | Weidong |
| 6,876,745 B1 | 4/2005 | Kurumatani |
| 7,003,665 B1 | 2/2006 | Dultz et al. |
| 7,006,633 B1 | 2/2006 | Reece |
| 7,095,851 B1 | 8/2006 | Scheidt |
| 7,181,017 B1 | 2/2007 | Nagel et al. |
| 7,912,747 B2 | 3/2011 | Sachedina |
| 7,929,702 B2 | 4/2011 | Brown et al. |
| 7,970,135 B1 | 6/2011 | Schwenk |
| 8,166,481 B2 | 4/2012 | Dadiomov et al. |
| 8,401,185 B1 | 3/2013 | Telang |
| 8,520,855 B1 | 8/2013 | Kohno et al. |
| 8,522,011 B2 | 8/2013 | Spalka et al. |
| 8,855,318 B1 | 10/2014 | Patnala et al. |
| 9,209,980 B2 | 12/2015 | Bowman et al. |
| 9,251,531 B2 | 2/2016 | Sarkissian |
| 9,258,130 B2 | 2/2016 | Hwang et al. |
| 9,298,806 B1 | 3/2016 | Vessenes et al. |
| 9,350,549 B2 | 5/2016 | Lumb |
| 9,436,923 B1 | 9/2016 | Sriram et al. |
| 9,641,338 B2 | 5/2017 | Sriram et al. |
| 9,673,975 B1 | 6/2017 | Machani |
| 9,961,030 B2 | 5/2018 | Murphy et al. |
| 10,050,779 B2 | 8/2018 | Alness et al. |
| 10,068,228 B1 | 9/2018 | Winklevoss et al. |
| 10,354,325 B1 | 7/2019 | Skala et al. |
| 10,510,053 B2 | 12/2019 | Armstrong |
| 10,516,527 B1 | 12/2019 | Machani et al. |
| 10,659,223 B2 | 5/2020 | Wright et al. |
| 10,719,816 B1 | 7/2020 | Kurani |
| 11,115,196 B1 | 9/2021 | Triandopoulos et al. |
| 11,188,907 B1 | 11/2021 | Vijayvergia et al. |
| 11,210,663 B2 | 12/2021 | Voorhees |
| 11,372,455 B2 | 6/2022 | Gauthier, Jr. |
| 11,455,378 B2 | 9/2022 | Wright et al. |
| 11,663,609 B2 | 5/2023 | Christidis et al. |
| 11,727,501 B2 | 8/2023 | Wright |
| 2001/0002486 A1 | 5/2001 | Kocher et al. |
| 2001/0050990 A1 | 12/2001 | Sudia |
| 2002/0112171 A1 | 8/2002 | Ginter et al. |
| 2002/0198791 A1 | 12/2002 | Perkowski |
| 2003/0026432 A1 | 2/2003 | Woodward |
| 2003/0046202 A1 | 3/2003 | Knapp |
| 2003/0048906 A1 | 3/2003 | Vora et al. |
| 2003/0081785 A1 | 5/2003 | Boneh et al. |
| 2003/0188153 A1 | 10/2003 | Demoff et al. |
| 2004/0030932 A1 | 2/2004 | Juels et al. |
| 2004/0049687 A1 | 3/2004 | Orsini et al. |
| 2004/0078775 A1 | 4/2004 | Chow et al. |
| 2004/0111484 A1 | 6/2004 | Young et al. |
| 2004/0190181 A1 | 9/2004 | Hikosaka et al. |
| 2004/0193890 A1 | 9/2004 | Girault |
| 2004/0252831 A1 | 12/2004 | Jehara |
| 2005/0071283 A1 | 3/2005 | Randle et al. |
| 2005/0094806 A1 | 5/2005 | Jao et al. |
| 2005/0138374 A1 | 6/2005 | Zheng et al. |
| 2006/0023887 A1 | 2/2006 | Agrawal et al. |
| 2006/0034494 A1 | 2/2006 | Holloran |
| 2006/0153365 A1 | 7/2006 | Beeson |
| 2006/0153366 A1 | 7/2006 | Beeson |
| 2006/0153367 A1 | 7/2006 | Beeson |
| 2006/0153368 A1 | 7/2006 | Beeson |
| 2006/0153370 A1 | 7/2006 | Beeson |
| 2006/0156012 A1 | 7/2006 | Beeson |
| 2006/0156013 A1 | 7/2006 | Beeson |
| 2006/0161485 A1 | 7/2006 | Meldahl |
| 2006/0173788 A1 | 8/2006 | Nath Pandya et al. |
| 2006/0179319 A1 | 8/2006 | Krawczyk |
| 2006/0242038 A1 | 10/2006 | Giudilli |
| 2006/0248114 A1 | 11/2006 | Anderson et al. |
| 2007/0055880 A1 | 3/2007 | Auter et al. |
| 2007/0165843 A1 | 7/2007 | Lauter et al. |
| 2007/0192842 A1 | 8/2007 | Beaulieu et al. |
| 2007/0223706 A1 | 9/2007 | Gantman et al. |
| 2007/0265978 A1 | 11/2007 | Kahn et al. |
| 2007/0269040 A1 | 11/2007 | Yuval et al. |
| 2007/0276836 A1 | 11/2007 | Chatterjee et al. |
| 2007/0288320 A1 | 12/2007 | Cooper et al. |
| 2008/0048022 A1 | 2/2008 | Vawter |
| 2008/0082817 A1 | 4/2008 | Takahashi et al. |
| 2008/0101596 A1 | 5/2008 | Cerruti et al. |
| 2008/0137857 A1 | 6/2008 | Bellare et al. |
| 2008/0144836 A1 | 6/2008 | Sanders et al. |
| 2008/0165955 A1 | 7/2008 | Ibrahim |
| 2008/0195499 A1 | 8/2008 | Meredith et al. |
| 2008/0260143 A1 | 10/2008 | Ibrahim |
| 2008/0263357 A1 | 10/2008 | Boyen |
| 2008/0285759 A1 | 11/2008 | Shaw |
| 2008/0288773 A1 | 11/2008 | Nguyen et al. |
| 2009/0022311 A1 | 1/2009 | Vanstone et al. |
| 2009/0048979 A1 | 2/2009 | Al-Herz et al. |
| 2009/0074179 A1 | 3/2009 | Futa et al. |
| 2009/0161876 A1 | 6/2009 | Sherkin |
| 2009/0282243 A1 | 11/2009 | Rose et al. |
| 2010/0005302 A1 | 1/2010 | Vishnu et al. |
| 2010/0023771 A1 | 1/2010 | Struik |
| 2010/0031369 A1 | 2/2010 | Grummt |
| 2010/0037055 A1 | 2/2010 | Fazio et al. |
| 2010/0042839 A1 | 2/2010 | Ho |
| 2010/0054458 A1 | 3/2010 | Schneider |
| 2010/0054480 A1 | 3/2010 | Schneider |
| 2010/0131752 A1 | 5/2010 | Flegel |
| 2010/0131755 A1 | 5/2010 | Zhu et al. |
| 2010/0134848 A1 | 6/2010 | Lynggaard et al. |

(56) References Cited

U.S. PATENT DOCUMENTS

| | | |
|---|---|---|
| 2010/0146292 A1 | 6/2010 | Shi et al. |
| 2010/0150341 A1 | 6/2010 | Dodgson et al. |
| 2010/0172501 A1 | 7/2010 | Tian et al. |
| 2010/0199095 A1 | 8/2010 | Ho |
| 2010/0217986 A1 | 8/2010 | Schneider |
| 2010/0228973 A1 | 9/2010 | Dancer et al. |
| 2010/0241848 A1 | 9/2010 | Smith et al. |
| 2010/0268778 A1 | 10/2010 | Kim et al. |
| 2011/0016510 A1 | 1/2011 | Matsuda et al. |
| 2011/0022854 A1 | 1/2011 | Macchetti et al. |
| 2011/0058672 A1 | 3/2011 | Sannino et al. |
| 2011/0202773 A1 | 8/2011 | Ghouti et al. |
| 2011/0208790 A1 | 8/2011 | Brown et al. |
| 2011/0208970 A1 | 8/2011 | Brown et al. |
| 2011/0246766 A1 | 10/2011 | Orsini et al. |
| 2011/0307698 A1 | 12/2011 | Vanstone |
| 2011/0311051 A1 | 12/2011 | Resch et al. |
| 2012/0011362 A1 | 1/2012 | Lambert |
| 2012/0039474 A1 | 2/2012 | Ho |
| 2012/0090026 A1 | 4/2012 | Andrews et al. |
| 2012/0100833 A1 | 4/2012 | Gao |
| 2012/0198228 A1 | 8/2012 | Oberheide et al. |
| 2012/0214441 A1 | 8/2012 | Raleigh |
| 2012/0233674 A1 | 9/2012 | Gladstone et al. |
| 2012/0243687 A1 | 9/2012 | Li et al. |
| 2012/0284794 A1 | 11/2012 | Trent et al. |
| 2012/0290830 A1 | 11/2012 | Resch et al. |
| 2012/0331287 A1 | 12/2012 | Bowman et al. |
| 2013/0030941 A1 | 1/2013 | Meredith et al. |
| 2013/0034642 A1 | 2/2013 | Eckstrom |
| 2013/0051552 A1 | 2/2013 | Handschuh et al. |
| 2013/0061049 A1 | 3/2013 | Irvine |
| 2013/0077783 A1 | 3/2013 | Anshel et al. |
| 2013/0103945 A1 | 4/2013 | Cannon et al. |
| 2013/0159413 A1 | 6/2013 | Davis et al. |
| 2013/0177157 A1 | 7/2013 | Li et al. |
| 2013/0191632 A1 | 7/2013 | Spector et al. |
| 2013/0198104 A1 | 8/2013 | Parker |
| 2013/0287210 A1 | 10/2013 | Matsuda et al. |
| 2013/0304642 A1 | 11/2013 | Campos |
| 2013/0305057 A1 | 11/2013 | Greco et al. |
| 2013/0305333 A1 | 11/2013 | Katzer et al. |
| 2013/0318578 A1 | 11/2013 | Palagummi |
| 2013/0318588 A1 | 11/2013 | Metzger |
| 2014/0012751 A1 | 1/2014 | Kuhn et al. |
| 2014/0046792 A1 | 2/2014 | Ganesan |
| 2014/0068246 A1 | 3/2014 | Hartley et al. |
| 2014/0082358 A1 | 3/2014 | Nakhjiri et al. |
| 2014/0108473 A1 | 4/2014 | Nowoczynski et al. |
| 2014/0129441 A1 | 5/2014 | Blanco et al. |
| 2014/0129844 A1 | 5/2014 | Johnson et al. |
| 2014/0132620 A1 | 5/2014 | Kim |
| 2014/0188719 A1 | 7/2014 | Poorachandran et al. |
| 2014/0195425 A1 | 7/2014 | Campos et al. |
| 2014/0195440 A1 | 7/2014 | Al-Herz et al. |
| 2014/0223580 A1 | 8/2014 | Neivanov et al. |
| 2014/0250006 A1 | 9/2014 | Makhotin et al. |
| 2014/0270401 A1 | 9/2014 | Irwin et al. |
| 2014/0330923 A1 | 11/2014 | Baptist et al. |
| 2015/0006386 A1 | 1/2015 | Tebbe |
| 2015/0024764 A1 | 1/2015 | Dochow et al. |
| 2015/0039470 A1 | 2/2015 | Crites |
| 2015/0052369 A1 | 2/2015 | Koning et al. |
| 2015/0066748 A1 | 3/2015 | Winslow et al. |
| 2015/0086020 A1 | 3/2015 | Harjula et al. |
| 2015/0089616 A1 | 3/2015 | Brezinski et al. |
| 2015/0095648 A1 | 4/2015 | Nix |
| 2015/0120567 A1 | 4/2015 | Van Rooyen et al. |
| 2015/0120569 A1 | 4/2015 | Belshe et al. |
| 2015/0124961 A1 | 5/2015 | Lambert et al. |
| 2015/0154562 A1 | 6/2015 | Emmerson |
| 2015/0170112 A1 | 6/2015 | DeCastro |
| 2015/0188698 A1 | 7/2015 | Tsai |
| 2015/0188700 A1 | 7/2015 | Ben Saied et al. |
| 2015/0205929 A1 | 7/2015 | Brama |
| 2015/0206106 A1 | 7/2015 | Yago |
| 2015/0213433 A1 | 7/2015 | Khan |
| 2015/0215336 A1 | 7/2015 | Navaraj et al. |
| 2015/0244690 A1 | 8/2015 | Mossbarger |
| 2015/0254463 A1 | 9/2015 | Ryhorchuk et al. |
| 2015/0254639 A1 | 9/2015 | Radu |
| 2015/0256347 A1 | 9/2015 | Tseng et al. |
| 2015/0262139 A1 | 9/2015 | Shtylman |
| 2015/0262140 A1 | 9/2015 | Armstrong |
| 2015/0269570 A1 | 9/2015 | Phan et al. |
| 2015/0278780 A1 | 10/2015 | Vaidyanathan et al. |
| 2015/0294425 A1 | 10/2015 | Benson |
| 2015/0296570 A1 | 10/2015 | Altamura et al. |
| 2015/0302401 A1 | 10/2015 | Metral |
| 2015/0304302 A1 | 10/2015 | Zhang |
| 2015/0310497 A1 | 10/2015 | Valin et al. |
| 2015/0324764 A1 | 11/2015 | Van Rooyen et al. |
| 2015/0324789 A1 | 11/2015 | Dvorak et al. |
| 2015/0332224 A1 | 11/2015 | Melika et al. |
| 2015/0332395 A1 | 11/2015 | Walker et al. |
| 2015/0348017 A1 | 12/2015 | Allmen |
| 2015/0349958 A1 | 12/2015 | Lindell |
| 2015/0350171 A1 | 12/2015 | Brumley |
| 2015/0356523 A1 | 12/2015 | Madden |
| 2015/0363768 A1 | 12/2015 | Melika et al. |
| 2015/0363770 A1 | 12/2015 | Ronca et al. |
| 2015/0363773 A1 | 12/2015 | Ronca et al. |
| 2015/0363777 A1 | 12/2015 | Ronca et al. |
| 2015/0371224 A1 | 12/2015 | Lingappa |
| 2015/0379510 A1 | 12/2015 | Smith |
| 2015/0381729 A1 | 12/2015 | Manohar et al. |
| 2016/0012465 A1 | 1/2016 | Sharp |
| 2016/0026918 A1 | 1/2016 | Barbieri et al. |
| 2016/0027229 A1 | 1/2016 | Spanos et al. |
| 2016/0028552 A1 | 1/2016 | Spanos et al. |
| 2016/0055511 A1 | 2/2016 | Chidella et al. |
| 2016/0055583 A1 | 2/2016 | Liberty et al. |
| 2016/0065370 A1 | 3/2016 | Le Saint et al. |
| 2016/0071108 A1 | 3/2016 | Caldera et al. |
| 2016/0085955 A1 | 3/2016 | Lerner |
| 2016/0086175 A1 | 3/2016 | Finlow-Bates et al. |
| 2016/0092870 A1 | 3/2016 | Salama et al. |
| 2016/0092988 A1 | 3/2016 | Letourneau |
| 2016/0098723 A1 | 4/2016 | Feeney |
| 2016/0132684 A1 | 5/2016 | Barbas et al. |
| 2016/0140335 A1 | 5/2016 | Proulx et al. |
| 2016/0149878 A1 | 5/2016 | Pogorelik et al. |
| 2016/0162897 A1 | 6/2016 | Feeney |
| 2016/0203522 A1 | 7/2016 | Shiffert et al. |
| 2016/0203572 A1 | 7/2016 | Mcconaghy et al. |
| 2016/0210617 A1 | 7/2016 | Leger |
| 2016/0234026 A1 | 8/2016 | Wilkins et al. |
| 2016/0260171 A1 | 9/2016 | Ford et al. |
| 2016/0261408 A1 | 9/2016 | Peddada et al. |
| 2016/0261565 A1 | 9/2016 | Lorenz et al. |
| 2016/0261690 A1 | 9/2016 | Ford |
| 2016/0269182 A1 | 9/2016 | Sriram et al. |
| 2016/0275294 A1 | 9/2016 | Irvine |
| 2016/0275492 A1 | 9/2016 | Brickell et al. |
| 2016/0283941 A1 | 9/2016 | Andrade |
| 2016/0292672 A1 | 10/2016 | Fay et al. |
| 2016/0294562 A1 | 10/2016 | Oberheide et al. |
| 2016/0321434 A1 | 11/2016 | McCoy et al. |
| 2016/0335533 A1* | 11/2016 | Davis .................... G06Q 40/08 |
| 2016/0335924 A1 | 11/2016 | Ikarashi et al. |
| 2016/0337119 A1 | 11/2016 | Hosaka et al. |
| 2016/0337124 A1 | 11/2016 | Rozman |
| 2016/0342977 A1 | 11/2016 | Lam |
| 2016/0342984 A1 | 11/2016 | Thomas et al. |
| 2016/0342986 A1* | 11/2016 | Thomas ............. G06Q 20/3823 |
| 2016/0342994 A1 | 11/2016 | Davis |
| 2016/0344543 A1 | 11/2016 | Alness et al. |
| 2016/0350749 A1 | 12/2016 | Wilkins et al. |
| 2016/0352518 A1 | 12/2016 | Ford et al. |
| 2016/0379208 A1 | 12/2016 | Deliwala et al. |
| 2016/0381010 A1 | 12/2016 | Bhandari et al. |
| 2017/0005804 A1* | 1/2017 | Zinder .................. H04L 9/3247 |
| 2017/0011394 A1 | 1/2017 | Kumar et al. |
| 2017/0012948 A1 | 1/2017 | Peeters et al. |

(56) References Cited

U.S. PATENT DOCUMENTS

| 2017/0017936 A1 | 1/2017 | Bisikalo et al. |
| 2017/0024817 A1 | 1/2017 | Wager et al. |
| 2017/0046664 A1 | 2/2017 | Haldenby et al. |
| 2017/0046668 A1 | 2/2017 | Rowley et al. |
| 2017/0046693 A1 | 2/2017 | Haldenby et al. |
| 2017/0046698 A1 | 2/2017 | Haldenby et al. |
| 2017/0046792 A1* | 2/2017 | Haldenby .......... G06Q 10/0631 |
| 2017/0046806 A1* | 2/2017 | Haldenby .............. G06Q 40/08 |
| 2017/0061138 A1 | 3/2017 | Lambert |
| 2017/0061833 A1 | 3/2017 | Joye et al. |
| 2017/0075877 A1 | 3/2017 | Lepeltier |
| 2017/0083907 A1 | 3/2017 | McDonough et al. |
| 2017/0083910 A1 | 3/2017 | Kraemer et al. |
| 2017/0091148 A1 | 3/2017 | Takahashi |
| 2017/0091750 A1 | 3/2017 | Maim |
| 2017/0091764 A1 | 3/2017 | Lloyd et al. |
| 2017/0103385 A1* | 4/2017 | Wilson, Jr. ......... G06Q 20/3825 |
| 2017/0109540 A1 | 4/2017 | Heiman et al. |
| 2017/0116608 A1 | 4/2017 | Forzley et al. |
| 2017/0124348 A1 | 5/2017 | Pourzandi et al. |
| 2017/0132620 A1 | 5/2017 | Miller et al. |
| 2017/0132621 A1 | 5/2017 | Miller et al. |
| 2017/0148016 A1 | 5/2017 | Davis |
| 2017/0154331 A1 | 6/2017 | Voorhees |
| 2017/0154391 A1 | 6/2017 | Watkins et al. |
| 2017/0169403 A1 | 6/2017 | Zhang |
| 2017/0178237 A1 | 6/2017 | Wong |
| 2017/0178263 A1 | 6/2017 | Kraemer et al. |
| 2017/0185527 A1 | 6/2017 | Jeda |
| 2017/0187535 A1* | 6/2017 | Middleton ........... G06Q 20/065 |
| 2017/0200137 A1 | 7/2017 | Vilmont |
| 2017/0228547 A1 | 8/2017 | Smith et al. |
| 2017/0243193 A1 | 8/2017 | Manian et al. |
| 2017/0243214 A1 | 8/2017 | Johnsrud et al. |
| 2017/0250801 A1 | 8/2017 | Chen et al. |
| 2017/0300877 A1 | 10/2017 | Mann et al. |
| 2017/0308580 A1 | 10/2017 | Naganuma et al. |
| 2017/0316390 A1 | 11/2017 | Smith et al. |
| 2017/0324663 A1 | 11/2017 | Menase |
| 2017/0324715 A1 | 11/2017 | Frincu et al. |
| 2018/0025670 A1 | 1/2018 | Karashi et al. |
| 2018/0034810 A1 | 2/2018 | Pe'Er et al. |
| 2018/0109377 A1 | 4/2018 | Fu |
| 2018/0123780 A1 | 5/2018 | Ikarashi |
| 2018/0131512 A1 | 5/2018 | Gajek |
| 2018/0146367 A1 | 5/2018 | Altin et al. |
| 2018/0176017 A1 | 6/2018 | Rodriguez et al. |
| 2018/0176222 A1 | 6/2018 | Bhaskar et al. |
| 2018/0225431 A1 | 8/2018 | Ikarashi et al. |
| 2018/0240107 A1 | 8/2018 | Andrade |
| 2018/0247191 A1 | 8/2018 | Katz et al. |
| 2018/0276663 A1 | 9/2018 | Arora |
| 2018/0285840 A1 | 10/2018 | Hasan |
| 2018/0341648 A1 | 11/2018 | Kakavand et al. |
| 2018/0349572 A1 | 12/2018 | Chen et al. |
| 2018/0367298 A1 | 12/2018 | Wright et al. |
| 2018/0376318 A1 | 12/2018 | Wang et al. |
| 2019/0014094 A1 | 1/2019 | Le Saint |
| 2019/0034936 A1 | 1/2019 | Nolan et al. |
| 2019/0080321 A1 | 3/2019 | Mundis et al. |
| 2019/0080404 A1 | 3/2019 | Molinari et al. |
| 2019/0080406 A1 | 3/2019 | Molinari et al. |
| 2019/0130368 A1 | 5/2019 | Li et al. |
| 2019/0149337 A1 | 5/2019 | Savanah et al. |
| 2019/0158470 A1 | 5/2019 | Wright et al. |
| 2019/0188793 A1 | 6/2019 | Molinari et al. |
| 2019/0199531 A1 | 6/2019 | Staples et al. |
| 2019/0220859 A1 | 7/2019 | Weight et al. |
| 2019/0229911 A1 | 7/2019 | Allen |
| 2019/0238334 A1 | 8/2019 | Nakamura |
| 2019/0244186 A1 | 8/2019 | Guo et al. |
| 2019/0266132 A1 | 8/2019 | Rubenstein |
| 2019/0305863 A1 | 10/2019 | Fayyad |
| 2019/0340352 A1 | 11/2019 | Peeters et al. |
| 2019/0349733 A1 | 11/2019 | Nolan et al. |
| 2019/0378139 A1 | 12/2019 | Stribady et al. |
| 2019/0392118 A1 | 12/2019 | Elden et al. |
| 2019/0392536 A1 | 12/2019 | Rice |
| 2020/0026785 A1 | 1/2020 | Patangia et al. |
| 2020/0250176 A1 | 8/2020 | Padmanabhan |
| 2020/0285935 A1 | 9/2020 | Song et al. |
| 2021/0056070 A1* | 2/2021 | Kakavand .......... G06F 16/1873 |
| 2021/0194677 A1 | 6/2021 | Pourzandi et al. |
| 2021/0304198 A1 | 9/2021 | Lingappa |
| 2021/0409489 A1 | 12/2021 | Speasl et al. |

FOREIGN PATENT DOCUMENTS

| CN | 1262007 A | 8/2000 |
| CN | 101447980 A | 6/2009 |
| CN | 101477669 A | 7/2009 |
| CN | 102144371 A | 8/2011 |
| CN | 102938036 A | 2/2013 |
| CN | 103440209 A | 12/2013 |
| CN | 103795529 A | 5/2014 |
| CN | 103927656 A | 7/2014 |
| CN | 104320262 A | 1/2015 |
| CN | 104331516 A | 2/2015 |
| CN | 104392354 A | 3/2015 |
| CN | 104463001 A | 3/2015 |
| CN | 104620535 A | 5/2015 |
| CN | 104704504 A | 6/2015 |
| CN | 105204802 A | 12/2015 |
| CN | 105306194 A | 2/2016 |
| CN | 105323064 A | 2/2016 |
| CN | 106022917 A | 10/2016 |
| CN | 106411503 A | 2/2017 |
| DE | 102010002241 B4 | 3/2012 |
| EP | 1477882 A2 | 11/2004 |
| EP | 2237473 A1 | 10/2010 |
| EP | 2538606 A1 | 12/2012 |
| EP | 2975570 A1 | 1/2016 |
| EP | 3010176 A1 | 4/2016 |
| FR | 3018370 A1 | 9/2015 |
| FR | 3018377 A1 | 9/2015 |
| FR | 3018378 A1 | 9/2015 |
| FR | 3018379 A1 | 9/2015 |
| JP | H11239124 A | 8/1999 |
| JP | H11289324 A | 10/1999 |
| JP | 2000502553 A | 2/2000 |
| JP | 2001069566 A | 3/2001 |
| JP | 2001195479 A | 7/2001 |
| JP | 2002026895 A | 1/2002 |
| JP | 2004192587 A | 7/2004 |
| JP | 2004246882 A | 9/2004 |
| JP | 2004341152 A | 12/2004 |
| JP | 2006293764 A | 10/2006 |
| JP | 2007036910 A | 2/2007 |
| JP | 2007067631 A | 3/2007 |
| JP | 2007242221 A | 9/2007 |
| JP | 2008136063 A | 6/2008 |
| JP | 2008146601 A | 6/2008 |
| JP | 2009105824 A | 5/2009 |
| JP | 2009171292 A | 7/2009 |
| JP | 2009526411 A | 7/2009 |
| JP | 2010503320 A | 1/2010 |
| JP | 2010219912 A | 9/2010 |
| JP | 2011082662 A | 4/2011 |
| JP | 2011211461 A | 10/2011 |
| JP | 2012515393 A | 7/2012 |
| JP | 2012151648 A | 8/2012 |
| JP | 2012244232 A | 12/2012 |
| JP | 2014068140 A | 4/2014 |
| JP | 2014153583 A | 8/2014 |
| JP | 2015536617 A | 12/2015 |
| JP | 5858506 B1 | 2/2016 |
| JP | 5858507 B1 | 2/2016 |
| JP | 2019512909 A | 5/2019 |
| KR | 20110012085 A | 2/2011 |
| KR | 101544722 B1 | 8/2015 |
| KR | 101579232 B1 | 1/2016 |
| KR | 20160009716 A | 1/2016 |
| RU | 2015108134 A | 10/2016 |
| RU | 2015109271 A | 10/2016 |

(56)          References Cited

FOREIGN PATENT DOCUMENTS

| | | | |
|---|---|---|---|
| TW | 201202975 | A | 1/2012 |
| WO | 2005096542 | A1 | 10/2005 |
| WO | 2005107141 | A1 | 11/2005 |
| WO | 2007113040 | A1 | 10/2007 |
| WO | 2009075374 | A1 | 6/2009 |
| WO | 2012039474 | A1 | 3/2012 |
| WO | 2012054785 | A1 | 4/2012 |
| WO | 2013034278 | A2 | 3/2013 |
| WO | 2013053058 | A1 | 4/2013 |
| WO | 2015127789 | A1 | 9/2015 |
| WO | 2015142765 | A1 | 9/2015 |
| WO | 2015171580 | A1 | 11/2015 |
| WO | 2015175854 | A2 | 11/2015 |
| WO | 2015188151 | A1 | 12/2015 |
| WO | 2015194798 | A1 | 12/2015 |
| WO | 2016022864 | A2 | 2/2016 |
| WO | 2016137360 | A2 | 9/2016 |
| WO | 2016137499 | A1 | 9/2016 |
| WO | 2016161073 | A1 | 10/2016 |
| WO | 2017006134 | A1 | 1/2017 |
| WO | 2017112664 | A1 | 6/2017 |

OTHER PUBLICATIONS

Andreas M. Antonopoulos, "Mastering Bitcoin", Publisher: O'Reilly Media, Inc., Release Date: Dec. 2014 (Year: 2014).*
UK Commercial Search Report mailed Jan. 18, 2017, Patent Application No. GB510135, filed Mar. 16, 2016, 5 pages.
Antonopoulos, "Mastering Bitcoin, Chapter 4, Keys, Addresses, Wallets", O'Reilly, 34 pages.
The Institute of Electrical and Electronics Engineers, Inc., "IEEE P1363, D1-pre Draft Standard for Public Key Cryptography", Prepared by the 1363 Working Gorup of the C/MSC Committee, Jun. 2009, 362 pages.
Wikipedia, "Public-key Cryptography", Zosterops (talk contribs), Jul. 5, 2015, Retrieved from https://en.wikipedia.org/w/index.php?title=Public-key_cryptography$oldid=670016308, 14 pages.
Omnilayer, Omni Protocol Specification (formerly Mastercoin), retrieved from https://github.com/OmniLayer/spec/blob/9978cc3984ae0b6e51216c4ae74042fc4097b993/README.md on Apr. 19, 2024, 58 pages.
Vroblefski et al., "Managing User Relationships in Hierarchies for Information System Security", Science Direct, Decision Support System 43, 2007, 12 pages.
Wikipedia, "Diffie-Hellman Key Exchange," retrieved from https://en.wikipedia.org/w/index.php?title=Diffie%E2%80%93Hellman_key_exchange&oldid=759611604, Jan. 2017, 10 pages.
Nikkei Business Publications, Inc., "Blockchain & Bitcoin", 2016, 4 pages.
Bitcoin Wiki, "Contract," Bitcoin Wiki, https://en.bitcoin.it/w/index.php?title=Contract&oldid=59172, May 22, 2011 (updated dated Oct. 22, 2015) [retrieved Jan. 8, 2024], 2 pages.
Fromknecht Conner, et al., "A Decentralized Public Key Infrastructure with Identity Retention" Nov. 11, 2024, 16 pages.
Buterin, "Ethereum White Paper", A Next Generation Smart Contract & Decentralized Application Platform, 2014, 36 pages.
Japanese Notice of Reason(s) for Rejection mailed Mar. 30, 2021, Patent Application No. 2018-539893, 6 pages.
Japanese Office Action mailed Feb. 16, 2021, Patent Application No. 2018-539331, 7 pages.
Japanese Office Action mailed Jan. 22, 2019, Patent Application No. 2018-516682, filed Feb. 16, 2017, 14 pages.
Japanese Office Action mailed Oct. 6, 2020, Patent Application No. 2018-539865, 14 pages.
Japanese Office Action mailed Oct. 8, 2019, Patent Application No. 2018-539895, 9 pages.
Jesionek et al., "BIP0032: Hierarchical Deterministic Wallets," GitHub, https://github.com/bitcoin/bips/blob/master/bip-0032.mediawiki, Jan. 2014, 9 pages.

Il2012 et al., "MinAddress : Now remember your addresses easily," BitCoinTalk, Sep. 16, 2014 (retrieved Jun. 16, 2020), https://bitcointalk.org/index.php?topic=774741.150;wap2, 3 pages.
Ken K., "Tutorial 1: Your first contract," Ethereum.org, Dec. 2014, https://web.archive.org/save/_embed/https://forum.ethereum.org/discussion/1634/tutorial-1-your-first-contract/p1, 22 pages.
Kens et al., "Cryptocontracts Will Turn Contract Law Into a Programming Language ," Hacker News, Feb. 23, 2014, https://news.ycombinator.com/item?id=7287155, 12 pages.
Killerstorm et al., "Transcript for #bitcoin-dev Sep. 3, 2012," BitcoinStats, http://www.bitcoinstats.com/irc/bitcoin-dev/logs/2012/09/03, Sep. 3, 2012 [retrieved Dec. 21, 2018], 14 pages.
Koblitz et al., "Cryptocash, Cryptocurrencies, and Cryptocontracts," Designs, Codes and Cryptography 78(1):87-102, publication available online Oct. 1, 2015, print publication Jan. 2016.
Kosba et al., "Hawk: The Blockchain Model of Cryptography and Privacy-Preserving Smart Contracts," IEEE Symposium on Security and Privacy, May 22, 2016, 31 pages.
Kravchenko, "Distributed multi-ledger model for financial industry," Github.com, Oct. 21, 2015 [retrieved Jan. 30, 2017], https://github.com/WebOfTrustInfo/rebooting-the-web-of-trust/blob/master/topics-andadvance-readings/DistributedMulti-ledgerModelForFinancialIndustry.md, 2 pages.
Krawczyk, "HMQV: A High-Performance Secure Diffie-Hellman Protocol," Annual International Cryptology Conference 2005, Aug. 14, 2005, first disclosed online Jul. 5, 2005, 66 pages.
Krellenstein, "The Counterparty Protocol," GitHub, https://github.com/jsimnz/Counterparty/blob/master/README.md, Jan. 8, 2014 [Dec. 12, 2018], 4 pages.
Lazarovich, Amir, "Invisible Ink: Blockchain for Data Privacy", May 8, 2015, 85 pages.
Lebeau, "An Ethereum Journey to Decentralize All Things," retrieved from https://medium.com/@SingularDTV/an-ethereum-journey-to-decentralize-all-things- 8d62b02e232b#.r6n9w8kqh, Jul. 11, 2016, 10 pages.
Luu et al., "Demystifying Incentives in the Consensus Computer," ISBN, Oct. 2015, 14 pages.
Mainelli, "Blockchain: why smart contracts need shrewder people," Banking Technology, Apr. 4, 2016 [retrieved Jan. 30, 2017], http://www.bankingtech.com/461572/blockchain-why-smart-contracts-need-shrewderpeople/, 3 pages.
Maxwell et al., "Deterministic wallets," Bitcoin Forum, https://bitcointalk.org/index.php?topic=19137.0;all, Jun. 18, 2011 [retrieved Dec. 10, 2018], 104 pages.
McCorry et al., "Authenticated Key Exchange over Bitcoin," International Conference on Research in Security Standardisation 2015, Dec. 15, 2015, 18 pages.
Menezes et al., "Handbook of Applied Cryptography," CRC Press, Oct. 16, 1996, 811 pages.
Menezes et al., "Handbook of Applied Cryptography: pp. 33, 38," CRC Press, Oct. 16, 1996, 3 pages.
Mezzomix et al., "Angebot: BTC (2-aus-3) Multisig Escrow (Treuhandabwicklung)," Bitcoin Forum, Feb. 9, 2014, https://bitcointalk.org/index.php?topic=456563.0, 7 pages.
Michalko et al., "Decent Whitepaper," retrieved from http://forklog.net/decent-finalizes-its-decentralized-content-distribution-platform/, Nov. 2015, 20 pages.
Michalko, "Decent Finalizes its Decentralized Content Distribution Platform," retrieved from http://forklog.net/decent-finalizes-its-decentralized-content-distribution-platform/, Dec. 14, 2016, 2 pages.
Mike et al., "Contract," Bitcoin Wiki, Oct. 22, 2015 version (first disclosed May 22, 2011) [retrieved May 12, 2020], https://en.bitcoin.it/w/index.php?title=Contract&oldid=59172, 11 pages.
Minsky et al., "Computation: Finite and Infinite Machines Chapter 14: Very Simple Bases for Computability," Prentice Hall, Inc, 1967, 29 pages.
Mirzadeh et al., "CPFP: An Efficient Key Management Scheme for Large Scale Personal Networks", IEEE, 2008, 6 pages.
Mrbandrews, "Bitcoin Core 0.11 (ch 2): Data Storage," Bitcoin Wiki, Jan. 13, 2016 (last revision Jan. 21, 2016) [retrieved May 8, 2020], https://en.bitcoin.it/w/index.php?title=Bitcoin_Core_0.11_(ch_2):_Data_storage&oldid=60024, 10 pages.

(56) References Cited

OTHER PUBLICATIONS

Mülli, "A Decentralized Bitcoin Exchange with Bitsquare—Attack Scenarios and Countermeasures," University of Zurich Department of Informatics Communication Systems Group Master Thesis, Jul. 30, 2015, 61 pages.

Nakamoto, "Bitcoin: A Peer-to-Peer Electronic Cash System," Bitcoin, Oct. 31, 2008, https://bitcoin.org/bitcoin.pdf, 9 pages.

Noizat et al., "Blockchain Electronic Vote," retrieved from https://www.weusecoins.com/assets/pdf/library/blockchain-electronic-vote.pdf, Apr. 29, 2015, 9 pages.

Noizat, "Handbook of Digital Currency Chapter 22: Blockchain Electronic Vote," Elsevier Inc., David Lee Kuo Chuen (ed.), May 2015, 9 pages.

Nxt, "Voting," nxt.org, website archived on Feb. 18, 2016 [retrieved May 31, 2022], https://web.archive.org/web/20160218021746/https://nxt.org/what-is-nxt/voting/, 3 pages.

Openchain, "Home Page," openchain.org, Dec. 22, 2015 [retrieved May 8, 2020], https://web.archive.org/web/20151222083734/https://www.openchain.org/, 18 pages.

Openssl Wiki, "Elliptic Curve Diffie Hellman," OpenSSL, https://wiki.openssl.org/index.php/Elliptic_Curve_Diffie_Hellman, Mar. 10, 2014 [retrieved Dec. 10, 2018], 5 pages.

Openssl Wiki, "EVP Key Agreement," OpenSSL, https://wiki.openssl.org/index.php/EVP_Key_Agreement, Apr. 28, 2017 [retrieved Dec. 10, 2018], 2 pages.

Perry, "Tapeke: Bitcoin Accounting for Non-Accountants," http://codinginmysleep.com/tapeke-bitcoin-accounting-for-non-accountants/, Jan. 21, 2015, 1 page.

Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.

Pornin, "Deterministic Usage of the Digital Signature Algorithm (DSA) and Elliptic Curve Digital Signature Algorithm (ECDSA)," Request for Comments: 6979, Independent Submission, Aug. 2013, 79 pages.

Pour, "Bitcoin multisig the hard way: Understanding raw P2SH multisig transactions," Dec. 20, 2014, https://www.soroushjp.com/2014/12/20/bitcoin-multisig-the-hard-way-understanding-raw-multisignature-bitcoin-transactions/, 19 pages.

Reddit, "Could Microsoft use the blockchain as a license key for it's software?," r/Bitcoin, Sep. 7, 2015 [retrieved May 8, 2020], https://www.reddit.com/r/Bitcoin/comments/3jz09c/could_microsoft_use_the_blockchain_as_a_license/?st=iw26pndq&sh=b862bf7d, 2 pages.

Reiner et al., "Bitcoin Wallet Identity Verification Specification," diyhpluswiki, http://diyhpl.us/~bryan/papers2/bitcoin/armory-verisign -bitcoin-wallet-identityspecification.pdf, Feb. 27, 2015 (retrieved Jan. 27, 2016), 24 pages.

Rockwell, "BitCongress—Process For Blockchain Voting & Law," retrieved from http://generalbitcoin.com/BitCongress_Whitepaper.pdf, Feb. 12, 2016, 8 pages.

Ryepdx et al., "Answer to 'What is the Global Registrar?'," Ethereum Stack Exchange, Feb. 26, 2016 [retrieved Jan. 30, 2017], http://ethereum.stackexchange.com/questions/1610/what-is-the-global-registrar, 3 pages.

Sams, "Ethereum: Turing-complete, programmable money," Cryptonomics, Feb. 1, 2014, https://cryptonomics.org/2014/02/01/ethereum-turing-complete-programmable-money, 4 pages.

Sanchez, "Marketplaces," GitHub, Jun. 10, 2015 [retrieved May 12, 2020], https://github.com/drwasho/openbazaar-documentation/blob/master/04%20Marketplaces.md, 37 pages.

Sanchez, "Protocol," Github, https://github.com/drwasho/openbazaar-documentation/blob/master/03%20Protocol.md, Jun. 15, 2015, 53 pages.

Sanchez, "Ricardian Contracts in OpenBazaar," Github, https://gist.github.com/drwasho/a5380544c170bdbbbad8, Jan. 2016, 12 pages.

UK IPO Search Report mailed Jan. 3, 2017, Patent Application No. 1604498.4, 4 pages.

UK IPO Search Report mailed Jul. 26, 2016, Patent Application No. GB1603114.8, filed Feb. 23, 2016, 5 pages.

UK IPO Search Report mailed Jul. 4, 2016, Patent Application No. GB1603125.4, filed Feb. 23, 2016, 6 pages.

UK IPO Search Report mailed Jul. 5, 2016, Patent Application No. GB1603123.9, filed Feb. 23, 2016, 5 pages.

UK IPO Search Report mailed Oct. 17, 2016, Patent Application No. GB1603117.1, filed Feb. 23, 2016, 5 pages.

UK IPO Search Report mailed Oct. 21, 2016, Patent Application No. GB1603112.2, 4 pages.

UK IPO Search Report mailed Oct. 26, 2016, Patent Application No. GB1603122.1, filed Feb. 23, 2016, 4 pages.

UK IPO Search Report mailed Oct. 9, 2017, Patent Application No. GB1707788.4, 6 pages.

UK IPO Search Report mailed Sep. 9, 2016, Patent Application No. GB1605571.7, filed Apr. 1, 2016, 5 pages.

Vayngrib, "DHT hardening," GitHub, https://github.com/tradle/about/wiki/DHT-hardening, Feb. 2, 2015 (last updated May 21, 2015) [retrieved Dec. 13, 2018], 5 pages.

Vayngrib, "Future, operating business on chain," Github.com, May 4, 2015 [retrieved Jan. 30, 2017], https://github.com/tradle/about/wiki/Future,-operating-business-on-chain, 9 pages.

Vietnamese Office Action mailed Sep. 27, 2018, Patent Application No. 1-2018-03358, filed Feb. 16, 2017, 2 pages.

Walport et al., "Distributed Ledger Technology: beyond block chain—A report by the UK Government Chief Scientific Adviser," United Kingdom Government Office for Science, Dec. 2015, 88 pages.

Watanabe et al., "Blockchain contract: A complete consensus using blockchain," IEEE 4th Global Conference on Consumer Electronics, Oct. 27, 2015, 3 pages.

Weller et al., "CounterpartyXCP/Documentation: Protocol Specification," Github.com, Jan. 25, 2015 (last edited Jun. 17, 2019) [retrieved Jan. 13, 2020], https://github.com/CounterpartyXCP/Documentation/blob/master/Developers/protocol_specification.md, 10 pages.

White, "How Computers Work," Que Publishing 7th Edition, Oct. 15, 2003, 44 pages.

Whitequark, "#bitcoin-wizards on Jul. 30, 2015—irc logs at whitequark.org," whitequark.org, https://irclog.whitequark.org/bitcoin-wizards/2015-07-30, Jul. 30, 2015 [retrieved Dec. 12, 2018], 8 pages.

Wikipedia, "Counterparty (platform)," Wikipedia, the Free Encyclopedia, last edited Dec. 6, 2019 [retrieved Jan. 13, 2020], https://en.wikipedia.org/wiki/Counterparty_(platform), 2 pages.

Wikipedia, "Shamir's Secret Sharing," Wikipedia the Free Encyclopedia, Jan. 20, 2017 version [retrieved on Jan. 9, 2019], https://en.wikipedia.org/w/index.php?title=Shamir's_Secret_Sharing&oldid=761082071, 6 pages.

Wikipedia, "Shamir's Secret Sharing," Wikipedia the Free Encyclopedia, Mar. 6, 2016 version [retrieved on Jun. 24, 2019], https://en.wikipedia.org/w/index.php?title=Shamir's_Secret_Sharing&oldid=708636892, 6 pages.

Willet et al., "Omni Protocol Specification (formerly Mastercoin)," Github, Nov. 5, 2013 [retrieved May 12, 2020], https://github.com/OmniLayer/spec/blob/9978cc3984ae0b6e51216c4ae74042fc4097b993/README.md, 69 pages.

Willoms et al., "Using blockchain to save and verify software licensing," Bitcoin Forum, https://bitcointalk.org/index.php?topic=671435.0, Jun. 30, 2014 [retrieved Dec. 13, 2018], 3 pages.

Wood, "Ethereum: A Secure Decentralised Generalised Transaction Ledger: Final Draft—Under Review," Etereum Project Yellow Paper, http://tech.lab.carl.pro/kb/ethereum/yellowpaper, Apr. 2014, 32 pages.

Wright, "Registry and Automated Management Method for Blockchain Enforced Smart Contracts," U.S. Appl. No. 15/138,717, filed Apr. 26, 2016.

Wuille, "Hierarchical Deterministic Wallets," Github, https://github.com/bitcoin/bips/blob/ab90b5289f0356282397fa9b8aa47d2238a7b380/bip-0032.mediawiki, Feb. 12, 2016 (retrieved Mar. 23, 2017), 9 pages.

Yaokai et al., "Experimental evaluation of the next-generation cryptocurrency platform Ethereum," CSS2015 Computer Security Symposium 2015 Proceedings 2015(3):1151-1158, Oct. 14, 2015.

(56) References Cited

OTHER PUBLICATIONS

Zhang et al., "AntShare Trading Platform," Github.com, Jun. 3, 2016 (last edited Aug. 21, 2016) [retrieved Jan. 30, 2017], https://github.com/AntShares/AntShares/wiki/Whitepaper-1.1, 9 pages.

Zyskind et al., "Decentralizing Privacy: Using a Blockchain to Protect Personal Data," 2015 IEEE CS Security and Privacy Workshops, May 21, 2015, 5 pages.

Zyskind et al., "Enigma: Decentralized Computation Platform with Guaranteed Privacy," arXiv preprint arXiv:1506, Jun. 10, 2015, 14 pages.

Eragmus et al., "Time to lobby Bitcoin's core devs: "SF Bitcoin Devs Seminar—Scalability to billions of transactions per day, satoshi-level Micropayments, near-zero risk of custodial theft, & Instant transactions" . . . but only w/ a malleability-fixing soft fork," Reddit r/bitcoin, https://www.reddit.com/r/Bitcoin/comments/2z2l9l/time_to_lobby_bitcoins_core_devs_sf_bitcoin_devs/, Mar. 14, 2015 [Dec. 12, 2018], 21 pages.

Ethereum, "EIP-20: Token Standard," retrieved from https://eips.ethereum.org/EIPS/eip-20, Nov. 19, 2015, 5 pages.

European Communication pursuant to Article 94(3) EPC mailed Jan. 2, 2020, Patent Application No. 18166910.2-1218, filed Feb. 16, 2017, 4 pages.

European Communication pursuant to Article 94(3) EPC mailed Jul. 1, 2019, Application No. 17707121.4-1218, filed Feb. 14, 2017, 6 pages.

Extended European Search Report mailed Jul. 18, 2018, Patent Application No. 18166910.2-1218, filed Feb. 16, 2017, 8 pages.

Familiar et al., "Transcript for #bitcoin-dev Mar. 27, 2015," BitcoinStats, http://bitcoinstats.com/irc/bitcoin-dev/logs/2015/03/27, Mar. 27, 2015 [archived version Jun. 27, 2016], 11 pages.

Fimkrypto, "Fimk 0.6.4 Released," Github.com, Feb. 11, 2016 [retrieved Jan. 30, 2017], https://github.com/fimkrypto/fimk/releases, 17 pages.

Flood et al., "Contract as Automaton: The Computational Representation of Financial Agreements," Office of Financial Research Working Paper No. 15-04, Mar. 26, 2015, 25 pages.

Fotiou et al., "Decentralized Name-based Security for Content Distribution using Blockchains," retrieved from, Mobile Multimedia Laboratory, Department of Informatics, Apr. 14, 2016, 6 pages.

Franco, "Understanding Bitcoin: Cryptography, Engineering and Economics," Wiley, ISBN: 978-1-119-01916-9, Oct. 2014, 144 pages.

Friedenbach et al., "Freimarkets: extending bitcoin protocol with user-specified bearer instruments, peer-to-peer exchange, off-chain accounting, auctions, derivatives and transitive transactions, " Version v0.01, http://freico.in/docs/freimarkets-v0.0.1.pdf, Aug. 24, 2013 [retrieved Dec. 12, 2018], 25 pages.

Friedenbach, "[Bitcoin-development] New Output Script Type," Linux Foundation, Sep. 14, 2013, https://lists.linuxfoundation.org/pipermail/bitcoin-dev/2013-September/003256.html, 2 pages.

Fuchita, "Special Topic: Innovation and Finance, Blockchain and Financial Transaction Innovation," Nomura Capital Market Quarterly 19-2(74):11-35, Nov. 1, 2015.

Fujimura et al., "Bright: A Concept for a Decentralized Rights Management System Based on Blockchain," 2015 IEEE 5th International Conference on Consumer Electronics—Berlin (ICCE—Berlin), Sep. 6, 2015, 2 pages.

Gautham, "Bitwage Makes Bitcoin Payroll Easier with New Features," NewsBTC, Mar. 9, 2016 (retrieved Jun. 16, 2020), https://www.newsbtc.com/2016/03/09/bitwage-makes-bitcoin-payroll-easier-new-features/, 4 pages.

Gennaro et al., "Threshold-Optimal DSA/ECDSA Signatures and an Application to Bitcoin Wallet Security," International Conference on Applied Cryptography and Network Security, Jun. 9, 2016, 42 pages.

Gitbook, "Ethereum Frontier Guide," Gitbook (Legacy), Feb. 4, 2016, 293 pages.

Github, "Bitcoin/Bips," retrieved from http://web.archive.org/web/20150307191218/https://github.com/bitcoin/bips/blob/master/bip-0016.mediawiki, Apr. 5, 2014, 4 pages.

github.com, "Dual Key Stealth Address", About Shadow, https://github.com/shadowproject/Shadow-Docs/blob/88501b5ba019780ef9a62d26678932c54a434e08/source/index.md, Mar. 10, 2016, 27 pages.

Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.

Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.

Goldfeder et al., "Securing Bitcoin wallets via threshold signatures" Princeton's Center for Information Technology Policy, Mar. 28, 2014, 11 pages.

Goldfeder et al., "Threshold signatures and Bitcoin wallet security: A menu of options," Freedom to Tinker, May 23, 2014 [retrieved Nov. 16, 2020], https://freedom-to-tinker.com/2014/05/23/threshold-signatures-and-bitcoin-wallet-security-a-menu-of-options/, 3 pages.

Gutoski et al., "Hierarchical deterministic Bitcoin wallets that tolerate key leakage (Short paper)," Financial Cryptography and Data Security: 19th International Conference, FC 2015, Revised Selected Papers, Jan. 26, 2015, 9 pages.

Gutoski et al., "Hierarchical Deterministic Bitcoin Wallets That Tolerate Key Leakage", Lecture Notes in Computer Science book series (LNSC, vol. 8975), Jan. 1, 2015, 9 pages.

Hacker News, "Cryptocontracts Will Turn Contract Law into a Programming Language," retrieved from https://news.ycombinator.com/item?id=7287155, Feb. 23, 2014, 12 pages.

Hao, "On Robust Key Agreement Based on Public Key Authentication," International Conference on Financial Cryptography and Data Security, Jan. 25, 2010, 12 pages.

Harayama et al., "Key escrow method of personal decryptographic key by using elliptic curve calculation," Institute of Electronics, Information and Communication Engineers (IEICE) Technical Report 109(85):91-96, Jun. 11, 2009.

Hearn, "Distributed markets," Bitcoin Wiki, https://en.bitcoin.it/wiki/Distributed_markets, Jul. 11, 2015 [retrieved Sep. 20, 2016], 5 pages.

Herbert et al., "A Novel Method for Decentralised Peer-to-Peer Software License Validation Using Cryptocurrency Blockchain Technology," Proceedings of the 38th Australasian Computer Science Conference, Jan. 27, 2015, 9 pages.

International Search Report and Written Opinion mailed Apr. 10, 2017, Patent Application No. PCT/IB2017/050861, 11 pages.

International Search Report and Written Opinion mailed Apr. 12, 2017, Patent Application No. PCT/IB2017/050818, 10 pages.

International Search Report and Written Opinion mailed Apr. 12, 2017, Patent Application No. PCT/IB2017/050829, 9 pages.

International Search Report and Written Opinion mailed Apr. 12, 2017, Patent Application No. PCT/IB2017/050866, 10 pages.

International Search Report and Written Opinion mailed Apr. 21, 2017, Patent Application No. PCT/IB2017/050820, 12 pages.

International Search Report and Written Opinion mailed Apr. 26, 2017, International Patent Application No. PCT/IB2017/050865, filed Feb. 16, 2017, 9 pages.

International Search Report and Written Opinion mailed Apr. 3, 2017, Patent Application No. PCT/IB2017/050824, filed Feb. 14, 2017, 13 pages.

International Search Report and Written Opinion mailed Apr. 3, 2017, Patent Application No. PCT/IB2017/050827, 10 pages.

International Search Report and Written Opinion mailed Apr. 3, 2017, Patent Application No. PCT/IB2017/050827, 13 pages.

International Search Report and Written Opinion mailed Aug. 3, 2018, Patent Application No. PCT/IB2018/053289, 10 pages.

International Search Report and Written Opinion mailed Mar. 29, 2017, Patent Application No. PCT/IB2017/050821, 10 pages.

International Search Report and Written Opinion mailed Mar. 29, 2017, Patent Application No. PCT/IB2017/050821, 13 pages.

International Search Report and Written Opinion mailed Mar. 30, 2017, Patent Application No. PCT/IB2017/050819, 13 pages.

International Search Report and Written Opinion mailed Mar. 30, 2017, Patent Application No. PCT/IB2017/050825, 9 pages.

(56)         References Cited

OTHER PUBLICATIONS

International Search Report and Written Opinion mailed May 29, 2017, International Patent Application No. PCT/IB2017/050815, filed Feb. 14, 2017, 10 pages.
International Search Report and Written Opinion mailed May 31, 2017, Patent Application No. PCT/IB2017/050856, filed Feb. 16, 2017, 11 pages.
International Search Report and Written Opinion mailed May 31, 2017, Patent Application No. PCT/IB2017/050867, 11 pages.
International Search Report and Written Opinion mailed May 31, 2017, Patent Application No. PCT/IB2017/050979, filed Feb. 21, 2017, 11 pages.
International Search Report and Written Opinion mailed May 31, 2017, Patent Application No. PCT/IB2017/050980, 12 pages.
Japanese Notice of Reason(s) for Rejection mailed Mar. 30, 2021, Patent Application No. 2018-539890, 8 pages.
Abeikverdi et al., "Generating interactive, secure multiple ECC key pairs deterministically," StackExchange, http://crypto.stackexchange.com/questions/25191/generating-interactivesecure-multiple-ecc-key-pairs-deterministically, Apr. 23, 2015 [retrieved Dec. 26, 2016], 2 pages.
Akutsu et al., "Taking on the challenge of creating epoch-making services that impress users. For services that can share the excitement of competitions around the world," NTT Technical Journal 27(5):10-14, May 1, 2015.
Allison, "Symbiont's Adam Krellenstein: There's really only two smart contract systems—Ethereum's and ours," International Business Times, https://www.ibtimes.co.uk/symbionts-adam-krellenstein-theres-really-only-two-smart-contract-systems-ethereums-ours-1530490, Nov. 25, 2015 [retrieved Dec. 12, 2018], 4 pages.
Alonso et al., "Digital Economy Outlook," BBVA Research, Oct. 2015, https://www.bbvaresearch.com/wpcontent/uploads/2015/10/Digital_Economy_Outlook_Oct15_Cap1.pdf, 16 pages.
Andersen, "Blockchain Technology: A game-changer in accounting?," Deloitte & Touche GmbH Wirtschaftsprüfungsgesellschaft, Mar. 2016, 5 pages.
Andresen et al., "Relay OP_Return data TxOut as standard transaction type. #2738," Github, Jun. 4, 2013, https://github.com/bitcoin/bitcoin/pull/2738, 12 pages.
Anonymous, "Bitcoin Core 0.11 (ch 2): Data Storage—Bitcoin Wiki," retrieved from https://en.bitcoin.it/w/index/php?title=Bitcoin_core-0.11_(ch_2):_Data_Storage, Jan. 16, 2016, 10 pages.
Anonymous, "Bitcoin Developer Guide," Bitcoin Project, https://web.archive.org/web/20160515171209/https://bitcoin.org/en/developer-guide, May 15, 2016 [retrieved Mar. 13, 2019], 55 pages.
Anonymous, "Bitcoin Stats," retrieved from http://bitcoinstats.com/irc/bitcoin-dev/logs/2015/03/27, Mar. 27, 2015, 11 pages.
Anonymous, "Bitsquare—The decentralised bitcoin exchange," Bitsquare.io, Jan. 3, 2016 , 14 pages.
Anonymous, "Homepage," website operational as of 2017 [retrieved Nov. 30, 2020], https://www.coinffeine.com/, 2 pages.
Antonopoulos et al., "Bitcoin Book," GitHub, retrieved from https://github.com/bitcoinbook/bitcoinbook, Jun. 8, 2017, 4 pages.
Antonopoulos, "Mastering Bitcoin—Unlocking Digital Cryptocurrencies," O'Reilly Media, Inc., Dec. 20, 2014, 282 pages.
Australian Office Action for Application No. 2017223158, mailed Jun. 22, 2021, 7 pages.
Bitcoin Forum, "Counterparty—Pioneering Peer-to-Peer Finance", https://bitcointalk.org/index.php?topic=395761.0, Feb. 1, 2014, 7 pages.
bitcoininvestor.com, "All-Star Panel: Ed Moy, Joseph VaughnPerling, Trace Mayer, Nick Szabo, Dr. Craig Wright," YouTube, https://youtu.be/LdvQTwjVmrE, Bitcoin Investor Conference, Oct. 29, 2015 [retrieved Dec. 12, 2018], 1 page.
Bitfreak! et al, "Understanding Stealth Addresses/Payments," Bitcoin Forum, Jun. 10, 2015 (retrieved Jun. 16, 2020), https://bitcointalk.org/index.php?topic=1086498.0, 8 pages.
Bitfury Group, "Smart Contracts on Bitcoin Blockchain," BitFury Group Limited, Aug. 13, 2015 (updated Sep. 4, 2015), http://bitfury.com/content/5-white-papers-research/contracts-1.1.1.pdf, 20 pages.

Block_Chan, "Tweet dated Nov. 7, 2018," Twitter, Nov. 7, 2018, https://twitter.com/block_chan/status/1060336404163584000, 1 page.
Bluematt, "Contract", Bitcoin Wiki, Oct. 22, 2015, 12 pages.
Bluematt, http://bitcoinstats.com/irc/bitcoin-dev/logs/2015/03/16.
Bradbury, "Developers Battle Over Bitcoin Block Chain," Coindesk, http://www.coindesk.com/developers-battle-bitcoin-block-chain/, Mar. 25, 2014, 3 pages.
Brown et al., "Standards for Efficient Cryptography 1: Elliptic Curve Cryptography Version 2.0," Certicom Research, May 21, 2009, 144 pages.
Brown et al., "Standards for Efficient Cryptography 2: Recommended Elliptic Curve Domain Parameters Version 2.0," Certicom Research, Jan. 27, 2010, 37 pages.
Brown, "On Distributed Satabases and Distributed Ledgers", Thoughts on the Future of Finance, Nov. 8, 2016, https://gendal.me/page/3/, 44 pages.
Burgess et al., "The Promise of Bitcoin and the Blockchain," Consumers' Research, Jul. 13, 2015, 97 pages.
Buterin et al., "Ethereum Development Tutorial," GitHub, Jul. 1, 2014 [retrieved Jul. 20, 2021], https://github.com/ethereum/wiki/wiki/ethereum-development-tutorial/0c1f501ea03a787910049b03723f1bfd7a14c9c6, 13 pages.
Buterin, "Bitcoin Multisig Wallet: The Future of Bitcoin," Bitcoin Magazine, Mar. 13, 2014 [retrieved May 12, 2020], https://bitcoinmagazine.com/articles/multisig-future-bitcoin-1394686504, 7 pages.
Buterin, "Introducing Ethereum Script 2.0", Ethereum Foundation Blog, Feb. 3, 2014, 9 pages.
Buterin, "Secret Sharing DAOs: The Other Crypto 2.0," Ethereum Blog, Dec. 26, 2014 [retrieved Nov. 21, 2019], https://ethereum.github.io/blog/2014/12/26/secret-sharing-daos-crypto-2-0/, 10 pages.
Campagna et al., "Standards for Efficient Cryptography 4: Elliptic Curve Qu-Vanstone Implicit Certificate Scheme (ECQV) Version 1.0," Certicom Research, Jan. 24, 2013, 32 pages.
Charlon et al., "Open-Assests-Protocol," Github.com, Nov. 17, 2015 [retrieved Jan. 30, 2017], https://github.com/OpenAssets/open-assets-protocol/blob/master/specification.mediawiki, 5 pages.
Christidis et al., "Blockchains and Smart Contracts for the Internet of Things," IEEE Access 4(1):2292-2303, May 10, 2016.
Coinprism, "80 bytes OP_Return explained," Coinprism Blog, http://blog.coinprism.com/2015/02/11/80-bytes-op-return/, Feb. 11, 2015 [retrieved Dec. 21, 2018], 8 pages.
Corallo, "[Bitcoin-development] Relative Checklocktimeverify (was CLTV proposal)," Linux Foundation, https://lists.linuxfoundation.org/pipermail/bitcoin-dev/2015-May/007858.html, May 4, 2015 [retrieved Dec. 12, 2018], 3 pages.
Counterparty, "Home Page," Counterparty, copyright 2018 [retrieved Jan. 13, 2020], counterparty.io, 3 pages.
Countyparty, "The Counterparty Protocol, " retrieved from https://github.com/jsimnz/Counterparty/blob/master/README.md, Jan. 8, 2014, 6 pages.
crpit.com, FYJC Mumbai 11th Online Admission 2021—Part—1, 2 Admission Form (mumbai.11thadmission.Org.in), https://crpit.com, Jul. 6, 2021 8 pages.
Danda et al., "hd-wallet-addrs," GitHub, https://github.com/dan-da/hd-wallet-addrs, Dec. 30, 2015 [retrieved Mar. 11, 2016], 7 pages.
Danda et al., "Is there any service/api for deriving HD wallet addresses from a master public key?," StackExchange, http://bitcoin.stackexchange.com/questions/38887/is-there-any-service-api-for-deriving-hdwallet-addresses-from-a-master-public-k, Jul. 30, 2015, 2 pages.
Danda, "Help / FAQ," MyBitPrices, https://mybitprices.info/hd-wallet-addrs.html, Jan. 1, 2016 [retrieved Mar. 11, 2016], 4 pages.
Das, "As Exchanges Pause Withdrawals, Chinese Bitcoin Investors Switch to P2P Trading," CCN, Feb. 13, 2017 [retrieved May 12, 2020], https://www.ccn.com/chinese-bitcoin-investors-switch-p2p-trading-exchanges-pause-withdrawals/, 4 pages.
Dash et al., "bips/bip-0047.mediawiki," Github, Feb. 24, 2016 (retrieved Jun. 16, 2020), https://github.com/bitcoin/bips/blob/15c0b250cb5b77eba3ea709b082d7da6a310d991/bip-0047.mediawiki, 16 pages.

(56) References Cited

OTHER PUBLICATIONS

Decker, "[BIP] Normalized transaction IDs," Bitcoin-Dev, https://bitcoin-development.narkive.com/DjOYjEig/bip-normalized-transaction-ids, Oct. 19, 2015 [retrieved Dec. 12, 2018], 16 pages.
Deloitte, "Blockchain Technology a Game-changer in Accounting", Mar. 2016, 5 pages.
Dixon, "True peer-to-peer currency exchange?," DGC Magazine, Jul. 2, 2013 [retrieved May 12, 2020], http://dgcmagazine.com/true-peer-to-peer-currency-exchange/, 6 pages.
Dorier, "Colored Coins and Ricardian Contracts," Coinprism Blog, Dec. 10, 2014 [retrieved Jan. 30, 2017], http://blog.coinprism.com/2014/12/10/colored-coins-and-ricardian-contracts/, 9 pages.
Drcode, "New Kid on the Blockchain," Hacker News, https://news.ycombinator.com/item?id=11372455, Mar. 28, 2016 [Dec. 12, 2018], 32 pages.
Drwasho, "Openbazaar Documentation", Github, Jun. 2015, 53 pages.
Durback, "Standard BIP Draft: Turing Pseudo-Completeness," Bitcoin-Dev, Dec. 10, 2015, https://bitcoin-development.narkive.com/uRciVtAQ/standard-bip-draft-turing-pseudo-completeness, 11 pages.
Zindros, Dionysis, "A Pseudonymous Trust System for a Decentralized Anonymous Marketplace", web-of-trust.md, https://gist.github.com/dionyziz/e3b296861175e0ebea4b, Jul. 2, 2014, 30 pages.
Subramanian, et al., "The State of Cryptocurrencies, Their Issues and Policy Interactions", International Information Management Association, vol. 24, No. 24, No. 3, 2015, pp. 25-40.
Greenspan, Dr. Gideon, "MultiChain Private Blcokchain", White Paper, Jun. 2015, 17 pages.
Swanson, Tim, "Watermarked Tokens and Pseudonymity on Public Blockchains", Nov. 4, 2015, 78 pages.
Manabu Takata et al., "Nikkei BP Mook, FinTech Revolution, Financial Common Sense Dissolved by Technology", Nikkei Business Publications, Inc., Jan. 27, 2016, ISBN: 978-4-8222-7188-6, pp. 44-47.
Atsushi Takeda et al., "System Architecture for Decentralized Authentication in P2P Network", IPSJ SIG technical Reports, Information Processing Society of Japan, Jun. 12, 2008, vol. 2008 No. 54, [ISSN] 0919-6072, pp. 63-68.
Sardesai, "Coinffeine: A P2P Alternative to Centralised Bitcoin Exchanges," Cryptocoins News, Mar. 2, 2014 [retrieved Feb. 14, 2017], https://www.cryptocoinsnews.com/coinffeine-p2p-alternative-centralised-bitcoin-exchanges/, 5 pages.
Satoshi et al., "Connection Limits," Bitcoin Forum, Aug. 9, 2010, https://bitcointalk.org/index.php?topic=741.0; prev_next=prev, 2 pages.
Scott, "Counterparty to Create First Peer-to-Peer Digital Asset Exchange Platform," Cointelegraph, https://cointelegraph.com/news/counterparty_to_create_first_peer_to_peer_digital_asset_exchange_platform, Apr. 10, 2014 [retrieved Dec. 12, 2018], 2 pages.
Sevareid et al., "Use Case Asset Depository," Github.com, Jan. 11, 2016 version (last edited May 5, 2016) [retrieved Jan. 30, 2017], https://github.com/hyperledger/hyperledger/wiki/Use-Case-Asset-Depository, 4 pages.
Snow et al., "Factom: Business Processes Secured by Immutable Audit Trails on the Blockchain Version 1.2," factom.com, Apr. 25, 2018, 38 pages.
Stampery, "Features: Blockchain-based data certification at your fingertips," Stampery.com, https://stampery.com/features/, archived Mar. 5, 2016 [retrieved Nov. 3, 2016], 4 pages.
Sullivan et al., "Peer-to-peer Affine Commitment using Bitcoin," Carnegie Mellon University, Jun. 17, 2015, 54 pages.
Swan, "Blockchain: Blueprint for a New Economy," O'Reilly, Feb. 2015, 149 pages.
Swanson, "Great Chain of Numbers: Chapter 3: Next Generation Platforms," Great Wall of Nos., Mar. 4, 2014 [retrieved Jan. 30, 2017], http://www.ofnumbers.com/2014/03/04/chapter-3-next-generation-platforms/, 25 pages.
Taiwanese Office Action mailed Apr. 12, 2021, Patent Application No. 109142412, 5 pages.
Taiwanese Office Action mailed Jul. 28, 2020, Patent Application No. 106105709, 9 pages.

Taiwanese Office Action mailed Oct. 7, 2020, Patent Application No. 106105713, 4 pages.
Tasca et al., "Digital Currencies: Principles, Trends, Opportunities, and Risks," ECUREX Research Working Paper, Sep. 7, 2015 (Oct. 2015 version), 110 pages.
Third-Party Submission Under 37 CFR 1.290 mailed Jun. 12, 2019, U.S. Appl. No. 16/078,605, filed Aug. 21, 2018, 31 pages.
Third-Party Submission Under 37 CFR 1.290 mailed Jun. 12, 2019, U.S. Appl. No. 16/079,089, filed Aug. 22, 2018, 19 pages.
Timeisnow77724 et al., "Help understanding counterparty, thanks in advance!," Reddit r/counterparty_xcp, https://www.reddit.com/r/counterparty_xcp/comments/2qntze/help_understanding_counterparty_thanks_in_advance/, Dec. 28, 2014 [retrieved Dec. 11, 2018], 4 pages.
Toomim, "P2pool as prior art for nChain's Turing Complete Transactions patent—or, how to patent all blockchain apps without anybody noticing," Medium, Sep. 3, 2018, https://medium.com/@j_73307/p2pool-as-prior-art-for-nchains-turing-complete-transactions-patent-or-how-to-patent-all-40f3d429eaa4, 13 pages.
Tuesta et al., "Smart contracts: the ultimate automation of trust?," BBVA Research Financial Inclusion Unit, Oct. 2015, 5 pages.
UK Commercial Search Report mailed Apr. 25, 2016, Patent Application No. 11603117.1, filed Feb. 23, 2016, 11 pages.
UK Commercial Search Report mailed Feb. 17, 2017, Patent Application No. 1604493.5, 8 pages.
UK Commercial Search Report mailed Jan. 13, 2017, Patent Application No. 1604498.4, 8 pages.
UK Commercial Search Report mailed Jun. 12, 2017, Patent Application No. GB510912, 6 pages.
UK Commercial Search Report mailed Jun. 14, 2016, Patent Application No. 1607249.8, 4 pages.
UK Commercial Search Report mailed Jun. 27, 2016, Patent Application No. GB1603123.9, filed Feb. 23, 2016, 11 pages.
UK Commercial Search Report mailed Jun. 27, 2016, Patent Application No. GB1603125.4, filed Feb. 23, 2016, 11 pages.
UK Commercial Search Report mailed Jun. 28, 2016, Patent Application No. GB1603122.1, filed Feb. 23, 2016, 12 pages.
UK Commercial Search Report mailed Jun. 6, 2016, Patent Application No. 1604497.6, filed Mar. 16, 2016, 6 pages.
UK Commercial Search Report mailed Jun. 9, 2016, Patent Application No. GB1603114.8 , 4 pages.
UK Commercial Search Report mailed Jun. 9, 2016, Patent Application No. GB1603117.1, filed Feb. 23, 2016, 12 pages.
UK Commercial Search Report mailed May 16, 2016, Patent Application No. GB1603125.4, 8 pages.
UK Commercial Search Report mailed May 20, 2016, Patent Application No. 1605026.2, 4 pages.
UK Commercial Search Report mailed May 24, 2016, Patent Application No. GB1605571.7, filed Apr. 1, 2016, 3 pages.
UK Commercial Search Report mailed May 9, 2016, Patent Application No. GB1603112.2, 6 pages.
UK Commercial Search Report mailed May 9, 2016, Patent Application No. GB1603114.8, filed Feb. 23, 2016, 2 bages.
UK Commercial Search Report mailed Nov. 14, 2016, Patent Application No. GB1607063.3, 8 pages.
UK Commercial Search Report mailed Nov. 30, 2016, Patent Application No. 1607058.3, filed Apr. 22, 2016, 7 bages.
UK Commercial Search Report mailed Oct. 10, 2016, Patent Application No. GB1607484.1, filed Apr. 29, 2016, 5 pages.
UK Commercial Search Report mailed Sep. 30, 2016, Patent Application No. 1606630.0, filed Apr. 15, 2016, 7 pages.
UK Expanded Commercial Search Report mailed Jun. 15, 2016, Patent Application No. 1605026.2, 5 pages.
UK IPO Search Report mailed Dec. 12, 2016, Patent Application No. GB1606630.0, filed Apr. 15, 2016, 4 pages.
UK IPO Search Report mailed Dec. 15, 2016, Patent Application No. GB1607063.3, 6 pages.
UK IPO Search Report mailed Dec. 21, 2016, Patent Application No. GB1607058.3, 3 pages.
UK IPO Search Report mailed Dec. 21, 2016, Patent Application No. GB1607058.3, filed Apr. 22, 2016, 3 pages.
UK IPO Search Report mailed Dec. 21, 2016, Patent Application No. GB1607484.1, 4 pages.

(56)        References Cited

OTHER PUBLICATIONS

UK IPO Search Report mailed Dec. 23, 2016, Patent Application No. GB1604495.0, 5 pages.

UK IPO Search Report mailed Dec. 28, 2016, Patent Application No. GB1604497.6, filed Mar. 16, 2016, 4 pages.

UK IPO Search Report mailed Dec. 5, 2016, Patent Application No. 1607249.8, 4 pages.

UK IPO Search Report mailed Dec. 6, 2016, Patent Application No. 1604493.5, 6 pages.

UK IPO Search Report mailed Dec. 6, 2016, Patent Application No. 1607482.5, 5 pages.

UK IPO Search Report mailed Jan. 25, 2017, Patent Application No. 1605026.2, 3 pages.

Fuchita, Yasuyuki, "Special Feature: Innovation and Finance-Blockchain and Financial Transaction Innovation", Nomura capital markets quarterly, Japan, Nomura Institute of Capital Markets Research, Nov. 1, 2015, vol. 19, No. 2 (consecutive number of issue 74), (with English Translation), 59 pages.

Bitfury Group, "Public Versus Private Blockchains", Part 2: Permissionless Blackchains, in collaboration with Jeff Garzik, Version 1.0, Oct. 20, 2015, 20 pages.

Gauthierdickey, et al. "Secure Peer-to-Peer Trading in Small and Large Scale Multiplayer Games", Multimedia Systems, Apr. 29, 2014, 13 pages.

Feng et al., "A Next Generation Cryptocurrency Platform Ethereum and Its Evaluation", Oct. 14, 2015, 12 pages.

Ramaswami, U., et al., "Genotype and Phenotype in Hypochondroplasia", 1998, Mosby, Inc., 5 pages.

JP Office Action for corresponding JP Patent Application No. 2024-113075, mailed Sep. 2, 2025, 6 pages.

Takayuki Saito News close-up, Nikkei Network, Japan, Nikkei BP, Mar. 28, 2014, No. 168, pp. 20-22.

* cited by examiner

| For comparison: Generic Contract metadata format | | | | |
|---|---|---|---|---|
| Field | Sub-field | Bytes | Value | Comments |
| Metadata1 | ContractType | 4 | | Coded value indicates type of contract. |
| | ContractPointer | 16 | | IPv6 address of the actual contract file location |
| | ContractTypeData1 | 12 | | Format depends on value of ContractType. Padded with zeros |
| Metadata2 | ContractHash | 20 | | RIPEMD-160(SHA256(actual contract file addressed by ContractPointer)) |
| | Jurisdiction | 2 | | Legal juristiction covering the metadata |
| | ContractTypeData2 | 10 | | Format depends on value of ContractType. Padded with zeros |

Fig. 3

| Scenario Definition | | | | |
|---|---|---|---|---|
| | Create a racehorse asset | | | |
| | and then pay winnings and collect costs | | | |
| Company Metadata | | | | |
| | | | | |
| Field | Sub-field | Bytes | Value | Comments |
| Asset | ContractType | 4 | 0x0000FF04 | Indicates unit |
| Metadata A | ContractPointer | 16 | xxxx.xxxx.xxxx.xxxx (...) .xxxx | Address of the *Asset Definition* file |
| | Padding | 12 | | Spare |
| Asset | ContractHash | 20 | ############### ... | Hash of the *Asset Definition* file (not the tokenisation!) |
| Metadata B | jurisdiction | 2 | EN | Specifies that the asset is covered by English law |
| | Options | 2 | 0x0000 | No options specified |
| | Padding | 8 | | Spare |

Fig. 4

| Stable Seed Funding | |
|---|---|
| STABLE-S3-T1 | Transaction-ID |
| Version number | Version number |
| 1 | Number of inputs |
| <Stable's current Satochi pool - assume 75000 Satochi | Prev Trans Output |
| IDX-00 | Prev Trans Output index |
| Script length | Script length |
| Sig-Stable PubK-Stable | ScriptSig |
| Sequence number | Sequence number |
| 2 | Number of outputs |
| 13,000 | Output value |
| Output script length | Output script length |
| OP_DUP OP_HASH160 <PubK-Racehorse Hash> OP_EQUALVERIFY OP_CHECKSIG | Output script |
| 61,000 | Output value |
| Output script length | Output script length |
| OP_DUP OP_HASH160 <PubK-Stable Hash> OP_EQUALVERIFY OP-CHECKSIG | Output script |
| LockTime | LockTime |

Racehorse share issuance

| Value | Field | Description |
|---|---|---|
| RACEHORSE-S3-T1 | Transaction-ID | |
| Version number | Version number | |
| 1 | Number of inputs | |
| STABLE-S3-T1 | Prev Trans Output | |
| IDX-00 | Prev Trans Output index | |
| Script length | Script length | |
| Sig-Racehorse PubK-Racehorse | ScriptSig | |
| Sequence number | Sequence number | |
| 4 | Number of outputs | |
| 5,000 | Output value | |
| Output script length | Output script length | Redeem script allowing the stable to oncell without restriction |
| >>>OP_HASH160 <redeem script hash> OP_EQUAL | Output script | OP_1 InvestMetadataA InvestMetadataB PubK-Stable OP_3 OP_CHECKMULTISIG |
| 3,000 | Output value | |
| Output script length | Output script length | Redeem script allowing Alice to oncell without restriction |
| >>>OP_HASH160 <redeem script hash> OP_EQUAL | Output script | OP_2 InvestMetadataA InvestMetadataB PubK-Alice OP_3 OP_CHECKMULTISIG |
| 2,000 | Output value | |
| Output script length | Output script length | Redeem script allowing Bob to oncell without restriction |
| >>>OP_HASH160 <redeem script hash> OP_EQUAL | Output script | OP_1 InvestMetadataA InvestMetadataB PubK-Bob OP_3 OP_CHECKMULTISIG |
| 2,000 | Output value | |
| Output script length | Output script length | Racehorse smart contract to support clause 28 in contract |
| >>>OP_HASH160 <redeem script hash> OP_EQUAL | Output script | OP_1 HorseMetadataA HorseMetadataB PubK-Racehorse OP_3 OP_CHECKMULTISIG |
| lockTime | lock time | |

| Stable Fee Payment from Alice | |
|---|---|
| RACEHORSE-S3-T2 | Transaction-ID |
| Version number | Version number |
| 1 | Number of inputs |
| ALICE-S3-T1 | Prev Trans Output |
| IDX-00 | Prev Trans Output index |
| Script length | Script length |
| Sig-Alice PubK-Alice | ScriptSig |
| Sequence number | Sequence number |
| 1 | Number of outputs |
| 540,000 | Output value |
| Output script length | Output script length |
| OP_DUP OP_HASH160 <PubK-Racehorse Hash> OP_EQUALVERIFY OP_CHECKSIG SIGHASH_ANYONECANPAY | Output script |
| LockTime | LockTime |

| Stable Fee Payment from Bob | |
|---|---|
| RACEHORSE-S3-T3 | Transaction-ID |
| Version number | Version number |
| 1 | Number of inputs |
| BOB-S3-T1 | Prev Trans Output |
| IDX-00 | Prev Trans Output index |
| Script length | Script length |
| Sig-Bob PubK-Bob | ScriptSig |
| Sequence number | Sequence number |
| 1 | Number of outputs |
| 360,000 | Output value |
| Output script length | Output script length |
| OP_DUP OP_HASH160 <PubK-Racehorse Hash> OP_EQUALVERIFY OP_CHECKSIG SIGHASH_ANYONECANPAY | Output script |
| LockTime | LockTime |

Fig. 7

| Racehorse Stable Fees | |
|---|---|
| RACEHORSE-S3-T6 | Transaction-ID |
| Version number | Version number |
| 2 | Number of inputs |
| RACEHORSE-S3-T2 | Prev Trans Output |
| IDX-00 | Prev Trans Output index |
| Script length | Script length |
| Sig-Racehorse PubK-Racehorse | ScriptSig |
| RACEHORSE-S2-T4 | Prev Trans Output |
| IDX-01 | Prev Trans Output index |
| Script length | Script length |
| Sig-Racehorse PubK-Racehorse | ScriptSig |
| Sequence number | Sequence number |
| 1 | Number of outputs |
| 8,999,000 | Output value |
| Output script length | Output script length |
| OP_DUP OP_HASH160 <PubK-Stable Hash> OP_EQUALVERIFY OP_CHECKSIG | Output script |
| LockTime | LockTime |

Fig. 8

| Racehorse Winnings | |
|---|---|
| STABLE-S3-T2 | Transaction-ID |
| Version number | Version number |
| 1 | Number of inputs |
| EXCHANGE-S3-T1 | Prev Trans Output |
| IDX-00 | Prev Trans Output index |
| Script length | Script length |
| Sig-Stable PubK-Stable | ScriptSig |
| Sequence number | Sequence number |
| 1 | Number of outputs |
| 8,000,001,000 | Output value |
| Output script length | Output script length |
| OP_DUP OP_HASH160 <PubK-Racehorse Hash> OP_EQUALVERIFY OP_CHECKSIG | Output script |
| LockTime | LockTime |

Fig. 9

| Racehorse Winnings to Investors | |
| --- | --- |
| RACEHORSE-S3-T8 | Transaction-ID |
| Version number | Version number |
| 1 | Number of inputs |
| STABLE-S3-T2 | Prev Trans Output |
| IDX-00 | Prev Trans Output index |
| Script length | Script length |
| Sig-Racehorse PubK-Racehorse | ScriptSig |
| Sequence number | Sequence number |
| 3 | Number of outputs |
| 4,000,000,000 | Output value |
| Output script length | Output script length |
| OP_DUP OP_HASH160 <PubK-Stable Hash> OP_EQUALVERIFY OP_CHECKSIG | Output script |
| 2,400,000,000 | Output value |
| Output script length | Output script length |
| OP_DUP OP_HASH160 <PubK-Alice Hash> OP_EQUALVERIFY OP_CHECKSIG | Output script |
| 1,600,000,000 | Output value |
| Output script length | Output script length |
| OP_DUP OP_HASH160 <PubK-Bob Hash> OP_EQUALVERIFY OP_CHECKSIG | Output script |
| LockTime | LockTime |

Fig. 10

Alice Sells One Share to Eve

| Value | Field |
|---|---|
| ALICE-S3-T2 | Transaction-ID |
| Version number | Version number |
| 2 | Number of inputs |
| RACEHORSE-S3-T1 | Prev Trans Output |
| IDX-01 | Prev Trans Output index |
| Script length | Script length |
| Sig-Alice OP_1 InvestMetaDataA InvestMetadataB PubK-Alice OP_3 OP_CHECKMULTISIG | ScriptSig |
| <Alice's standard BTC account - assume 1000 Satoshis> | Prev Trans Output |
| IDX-00 | Prev Trans Output index |
| Script length | Script length |
| Sig-Alice PubK-Alice | ScriptSig |
| Sequence number | Sequence number |
| 2 | Number of outputs |
| 2,000 | Output value |
| Output script length | Output script length |
| >>>OP_HASH160 <redeem script hash> OP_EQUAL | Output script |
| 1,000 | Output value |
| Output script length | Output script length |
| >>>OP_HASH160 <redeem script hash> OP_EQUAL | Output script |
| LockTime | LockTime |

Annotations:
- Second input to pay the mining fee only
- Redeem script allowing Alice to onsell: OP_1 InvestMetaDataA InvestMetadataB PubK-Alice OP_3 OP_CHECKMULTISIG
- Redeem script allowing Eve to onsell: OP_1 InvestMetaDataA InvestMetadataB PubK-Eve OP_3 OP_CHECKMULTISIG

Fig. 11

SYSTEM AND METHOD FOR CONTROLLING ASSET-RELATED ACTIONS VIA A BLOCK CHAIN

CROSS-REFERENCE TO RELATED APPLICATIONS

This application is a continuation of U.S. patent application Ser. No. 16/079,089, filed Aug. 22, 2018, entitled "SYSTEM AND METHOD FOR CONTROLLING ASSET-RELATED ACTIONS VIA A BLOCKCHAIN," which is a 371 National Stage of International Patent Application No. PCT/IB2017/050824, filed Feb. 14, 2017, entitled "SYSTEM AND METHOD FOR CONTROLLING ASSET-RELATED ACTIONS VIA A BLOCKCHAIN," which claims priority to United Kingdom Patent Application No. 1603117.1, filed Feb. 23, 2016, United Kingdom Patent Application No. 1603123.9, filed Feb. 23, 2016, United Kingdom Patent Application No. 1603114.8, filed Feb. 23, 2016, United Kingdom Patent Application No. 1604225.1, filed Mar. 11, 2016, United Kingdom Patent Application No. 1606630.0, filed Apr. 15, 2016, and United Kingdom Patent Application No. 1619301.3, filed Nov. 15, 2016, the disclosures of which are incorporated herein by reference in their entirety.

BACKGROUND

This invention relates generally to the computer-implemented control, exchange and processing of assets. In particular, it relates to the field of smart contracts and is suited for use with a peer-to-peer distributed network such as a blockchain. This may be the Bitcoin Blockchain or an alternative blockchain platform. The invention is particularly beneficial in situations where ownership of an asset is split between multiple entities, and/or value is accrued or generated from the asset. The invention provides a mechanism for determining and responding to events which serve as triggers for action in such situations. The invention also comprises cryptographic techniques which provide enhanced security and anonymity in relation to the control and transfer of electronic assets.

SUMMARY

A blockchain is a computer-implemented decentralised, consensus-based, distributed system made up of blocks which in turn are made up of transactions. Each block contains a hash of the previous block so that blocks become chained together to create a permanent, unalterable record of all transactions which have been written to the blockchain since its inception. Transactions contain small programs known as scripts embedded into its inputs and outputs, which specify how and by whom the outputs of the transaction can be accessed.

The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations fall within the scope of the invention.

Blockchain technology is most widely known for the use of cryptocurrency implementation. However, in more recent times, digital entrepreneurs have begun exploring both the use of the cryptographic security system Bitcoin is based on, and the data that can be stored on the Blockchain, to implement new systems. These include but are not limited to:

Storing metadata: information can be transferred via a blockchain by embedding it as metadata within a transaction; this in turn can be used for:

Implementing digital tokens

Establishing contracts that are signed with digital signatures. Smart contracts may be designed to provide self-executing, machine readable solutions which can include conditions and tests that can be evaluated to determine which actions should be performed e.g. whether a payment should be made to a certain party.

It would be advantageous to be able to calculate and allocate income and/or costs to owners of blockchain-based assets in an automated, secure and effective manner. In order to do this, events (triggers) would need to be detected which generate actions such as income or costs payable to or by owners of such assets. A technique would then be needed for automatically (i.e. by machine) generating and signing blockchain transactions to execute the income or costs payments.

Such an improved solution has now been devised. The present invention may comprise a technical solution which is built upon a blockchain protocol to enable automated generation of blockchain transactions. The transactions may then be used to make transfers between entities via the blockchain such as payment of income or costs. Use of the blockchain ensures that there is a secure, public record of any payments made in regard to a given contract. This eliminates or at least reduces the need, in dispute scenarios, to gain access to proprietary systems and data sources to provide evidence for any delinquency against that contract. The invention may also comprise and utilise a novel technique for the generation of cryptographic keys. Some of the other benefits which flow from the invention are discussed below.

The invention may provide a computer-implemented system or mechanism for controlling, calculating, generating and/or executing exchanges on a blockchain. The exchanges (transfers) may relate to any type of physical, virtual or logical asset.

The invention may be arranged to control a transfer made via a blockchain in respect of an asset, and may comprise an asset or representation of an asset. The asset or representation may comprise one or more private cryptographic keys, each private key being associated with an owner of the asset. The private key(s) may part of a cryptographic key pair. One or more of the private keys may be generated according to a technique substantially as described below in the section entitled "method for sub-key generation". One or more of the private keys may be generated using a common secret. It may be a sub-key which is generated from a master cryptographic key.

The invention may comprise a technique for determining a secret which is common to a first and a second entity. The first or second entity may be the asset and the other entity may be a controller or other entity associated with the asset. This method may comprise the steps:

Determining a first entity second private key based on at least a first entity master private key and a generator value;

Determining a second entity second private key based on at least a second entity master private key and the generator value;

Determining a common secret (CS) at the first entity based on the first entity second private key and the second entity second public key, and determining the common secret (CS) at the second entity based on the second entity second private key and first entity second public key;

wherein the first entity second public key and the second entity second public key are respectively based on at least the first/second entity master key and the generator value.

The invention may also comprise a registry. The registry may store one or more public cryptographic keys. Each public key may correspond to one of the asset's private keys. The public key(s) may be associated with a redeem script hash that can be identified within an unspent blockchain transaction (UTXO).

The invention may comprise a smart contract comprising at least one rule relating to the automated generation of one or more blockchain transactions to enable a transfer to be made in respect of the asset. The smart contract may be machine readable and/or executable.

The invention may comprise a computing agent arranged to evaluate and/or execute the at least one rule of the smart contract. The computing agent may be substantially as described below.

The transfer may be a transfer of funds or some currency such as, for example, a portion of cryptocurrency. It may be a payment to be made in respect of the asset. It may relate to income or costs associated with the asset. The transfer may be made between parties specified in the smart contract. The currency may be Bitcoin, or any digital (crypto)currency, or a tokenised value.

The at least one rule provided in the smart contract may define a payment schedule associated with the asset.

The computing agent may be arranged to communicate with further computing agents. Each of said further computing agents may be arranged to perform a task associated with the asset. The computing agent may be arranged to coordinate and/or authorise the activities of each of the further computing agents. Thus, there may be a 'master' computing agent and one or more subordinate (further) computing agents. The master agent may be arranged to control, direct or monitor the activities of the one or more subordinate agents.

The invention may comprise at least one further computing agent arranged to generate a blockchain transaction relating to income associated with the asset (an 'income agent as described below).

The invention may comprise at least one further computing agent arranged to generate a blockchain transaction relating to a cost associated with the asset (a 'costs agent' as described below).

The invention may comprise at least one further computing agent arranged to process the netting off of income against payments associated with the asset (a 'netting agent' as described below).

The invention may comprise at least one further computing agent arranged to generate and/or transmit an alert to an owner of the asset, the alert providing a notification about an event relating to the asset (a 'notification agent' as described below).

The computing agent may be arranged to generate a blockchain transaction upon detection of an event or trigger specified in the smart contract.

The smart contract may be stored in a Distributed Hash Table. A hash of the contract may be provided within metadata associated with a blockchain transaction.

The invention may also comprise a computer-implemented method of controlling a transfer made via a blockchain in respect of an asset, the method comprising the steps:

defining an asset comprising at least one private cryptographic key, each private key being associated with an owner of the asset;

generating a registry comprising at least one public cryptographic key wherein each public key:

corresponds to a private key in the asset's one or more private keys, and is associated with a redeem script hash that can be identified within an unspent blockchain transaction;

generating a smart contract comprising at least one rule relating to the automated generation of one or more blockchain transactions to enable a transfer to be made in respect of the asset; and using a computing agent to evaluate and/or execute the at least one rule of the smart contract.

The transfer may be a transfer of currency to be made in respect of the asset, and wherein the transfer relates to income or costs associated with the asset. The currency may be Bitcoin, or any digital currency, or a tokenised value.

The at least one rule provided in the smart contract may define a payment schedule associated with the asset.

The method may further comprise the step of arranging the computing agent to communicate with further computing agents, and arranging each of said further computing agents to perform a task associated with the asset.

The computing agent may be arranged to coordinate and/or authorise the activities of each of the further computing agents.

The method may further comprise the step of providing:

i) at least one further computing agent arranged to generate a blockchain transaction relating to income associated with the asset;

ii) at least one further computing agent arranged to generate a blockchain transaction relating to a cost associated with the asset;

iii) at least one further computing agent arranged to process the netting off of income against payments associated with the asset;

iv) at least one further computing agent arranged to generate and/or transmit an alert to an owner of the asset, the alert providing a notification about an event relating to the asset.

The computing agent may be arranged to generate a blockchain transaction upon detection of an event or trigger specified in the smart contract.

The smart contract may be stored in a Distributed Hash Table, and a hash of the contract is provided within metadata associated with a blockchain transaction.

One or more embodiments of the invention may comprise a technique substantially as described below in the section entitled "method of sub-key generation". This may comprise a technique for determining a secret which is common to a first and a second entity. Hereafter, the term "node" may be used instead of "entity" for ease of reference. This method may comprise the steps:

Determining a first node second private key based on at least a first node master private key and a generator value;

Determining a second node second private key based on at least a second node master private key and the generator value;

Determining a common secret (CS) at the first node based on the first node second private key and the second node second public key, and determining the common secret (CS) at the second node based on the second node second private key and first node second public key;

wherein the first node second public key and the second node second public key are respectively based on at least the first/second node master key and the generator value.

Additionally or alternatively, one or more embodiments of the invention may comprise a computer-implemented method as follows:

determining, at a first node (C), a common secret (CS) that is common with the first node (C) and a second node (S), wherein the first node (C) is associated with a first asymmetric cryptography pair having a first node master private key ($V_{1C}$) and a first node master public key ($P_{1C}$), and the second node (S) is associated with a second asymmetric cryptography pair having a second node master private key ($V_{1S}$) and a second node master public key ($P_{1S}$), wherein the method comprises:

determining a first node second private key ($V_{2C}$) based on at least the first node master private key ($V_{1C}$) and a deterministic key (DK);

determining a second node second public key ($P_{2S}$) based on at least the second node master public key ($P_{1S}$) and the deterministic key (DK); and determining the common secret (CS) based on the first node second private key ($V_{2C}$) and the second node second public key ($P_{2S}$), wherein the second node (S) has the same common secret (S) based on a first node second public key ($P_{2C}$) and a second node second private key ($V_{2S}$), wherein:

the first node second public key ($P_{2C}$) is based on at least the first node master public key ($P_{1C}$) and the deterministic key (DK); and the second node second private key ($V_{2S}$) is based on at least the second node master private key ($V_{1S}$) and the deterministic key (DK).

The deterministic key (DK) may be based on a message (M). The method may also comprise the steps of:

generating a first signed message (SM1) based on the message (M) and the first node second private key ($V_{2C}$); and sending, over the communications network, the first signed message (SM1) to the second node (S), wherein the first signed message (SM1) can be validated with a first node second public key ($P_{2C}$) to authenticate the first node (C).

Preferably, the method may comprise the steps of:

receiving, over the communications network, a second signed message (SM2) from the second node (S);

validating the second signed message (SM2) with the second node second public key (P2S); and authenticating the second node (S) based on the result of validating the second signed message (SM2), wherein the second signed message (SM2) was generated based on the message (M), or a second message (M2), and the second node second private key ($V_{2S}$).

Preferably, the method may comprise the steps of:

generating a message (M); and sending, over a communications network, the message (M) to the second node (S).

Preferably, the method may comprise the steps of:

receiving the message (M), over the communications network, from the second node (S).

Preferably, the method may comprise the steps of:

receiving the message (M), over the communications network, from another node.

Preferably, the method may comprise the steps of:

receiving the message (M) from a data store, and/or an input interface associated with the first node (C).

Preferably, the first node master public key ($P_{1C}$) and second node master public key ($P_{1S}$) may be based on elliptic curve point multiplication of respective first node master private key ($V_{1C}$) and second node master private key ($V_{1S}$) and a generator (G).

Preferably, the method may comprise the steps of:

receiving, over the communications network, the second node master public key ($P_{1S}$); and storing, at a data store associated with the first node (C), the second node master public key ($P_{1S}$).

Preferably, the method may comprise the steps of:

generating, at a first node (C), the first node master private key ($V_{1C}$) and the first node master public key ($P_{1C}$);

sending, over the communications network, the first node master public key ($P_{1C}$) to the second node (S) and/or other node; and storing, in a first data store associated with the first node (C), the first node master private key ($V_{1C}$).

Preferably, the method may comprise the steps of:

sending, over the communications network, to the second node, a notice indicative of using a common elliptic curve cryptography (ECC) system with a common generator (G) for the method of determining a common secret (CS), and wherein the step of generating the first node master private key ($V_{1C}$) and the first node master public key ($P_{1C}$) comprises:

generating the first node master private key ($V_{1C}$) based on a random integer in an allowable range specified in the common ECC system; and determining the first node master public key ($P_{1C}$) based on elliptic curve point multiplication of the first node master private key ($V_{1C}$) and the common generator (G) according to the following formula:

$$P_{1C} = V_{1C} \times G.$$

Preferably, the method may comprise the steps of:

determining the deterministic key (DK) based on determining a hash of the message (M), and wherein the step of determining a first node second private key ($V_{2C}$) is based on a scalar addition of the first node master private key ($V_{1C}$) and the deterministic key (DK) according to the following formula:

$$V_{2C} = V_{1C} + DK, \text{ and}$$

wherein the step of determining a second node second public key (P2S) is based on the second node master public key ($P_{1S}$) with elliptic curve point addition to the elliptic curve point multiplication of the deterministic key (DK) and the common generator (G) according to the following formula:

$$P_{2S} = P_{1S} + DK \times G.$$

Preferably, the deterministic key (DK) may be based on determining a hash of a previous deterministic key.

The first asymmetric cryptography pair and the second asymmetric cryptography pair may be based on a function of respective previous first asymmetric cryptography pair and previous second asymmetric cryptography pair.

Any feature described above in relation to one aspect or embodiment may also be used in relation to any other aspect or relation. For example, any feature described in relation to the method may also apply to the system and vice versa.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompanying drawings, in which:

FIG. 3 shows the format of the metadata used in the transactions of FIGS. 5 to 11 for the Racehorse example used herein.

FIG. 4 shows the definition of a Racehorse asset.

FIG. 5 shows a transaction which starts a sequence for the 'racehorse' scenario used below, and in which the stable generates a private key for the Racehorse using the methods described below for generating a sub-key, and then seed funding the racehorse account for the share issuance.

FIG. 6 shows a blockchain transaction in which, following on from FIG. 5, the racehorse then issues shares in itself.

Figure 1:
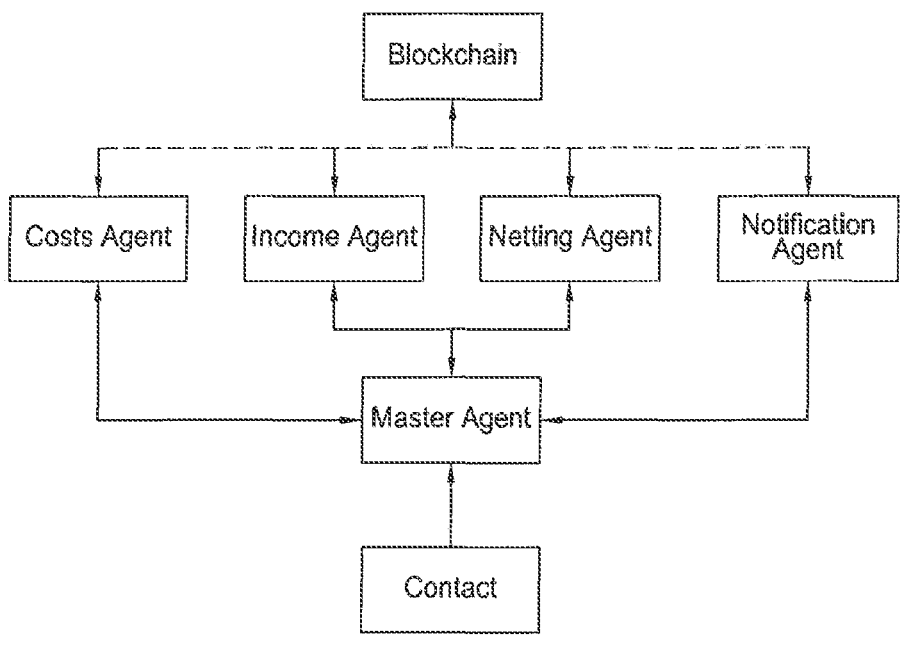
FIG. 1 illustrates an overview of a system implemented in accordance with an embodiment of the invention.

It should be noted that technically the stable owns the racehorse's private key but logically this is what is happening.

FIG. 7 shows a transaction for claiming a set of stable fees from investors.

FIG. 8 shows a transaction in which the Racehorse passes the stable fees back to the stable.

FIG. 9 shows a transaction which is generated when the Racehorse wins its first race, and the stable earns the £20,400. Using a standard BTC broker transaction (not shown here) the Exchange has paid the stable the equivalent amount of BTC in exchange for the GBP20,400 (transaction-ID=EXCHANGE-S3-T1). Using the output from EXCHANGE-S3-T1 as input, the stable generates a transaction to pay the winnings as BTC to the racehorse key.

FIG. 10 shows a transaction in which the racehorse pays out its winnings to the investor.

FIG. 11 shows a transaction in which Alice sells one share to Eve.

FIGS. 12 to 18 show various aspects of an illustrative technique for deriving sub-keys from a parent key as discussed below, this technique being suitable for use in relation to aspects of the present invention.

DETAILED DESCRIPTION

Key Terms Used Herein

The following terms are used herein to define key concepts and components.

| Name | Type |
|---|---|
| Actor | An actor is an entity or component within an embodiment of the present invention. |
| Agent | Herein, the term 'agent' may be used to refer to a computing resource which is a suitably arranged computing component(s), such as a server running a program, that provides processing functionality in parallel to the blockchain. It can monitor the state of the blockchain as well as receive inputs from off-block sources. It can respond and behave in a variety of ways depending upon the inputs it receives and/or the outcome of a test. In the figures or description, the term 'oracle' may be used as an alternative to 'agent'. The Agent may be substantially as described below in the section entitled "Illustrative Computing Agent for use with the invention". |
| Netting | "Netting" or "netting off" are terms used in financial contexts to describe a process wherein the value of two or more positions or transactions are consolidated (off set) so as to create a single value. It can be used to determine which party is owed remuneration in a multiparty agreement. |
| Asset | The asset is an actor that represents something that can apportion ownership to one of more Asset holders in variable amounts. These amounts can be simple percentages (e.g. 5%) or units (e.g. 100 units). The Asset comprises, or is at least associated with, both a private cryptographic key (which may be deterministically derived from the ultimate owner or controller's key) plus an Agent (as above). The private key may be deterministically derived from the ultimate owner or controller's key using a technique substantially as described below in the section entitle "method of sub-key generation". |
| Asset Holder | The asset holder is an actor that represents something that currently holds i.e. owns a proportion of an Asset. |
| Repository | The repository is an actor that represents the entity responsible for the storage (and potentially on-going maintenance) of the Contract document defining the payment schedule associated with the asset. |
| Contract | The Contract is the document that contains the formal definition for how to determine the payments, and the schedule associated with the payments for this asset. It is a smart contract which may be machine readable and executable. It may also (depending on the implementation method used) hold details of the current ownership of the asset. |
| Ownership Registry | The Ownership Registry is a document or database that defines the current ownership (and ownership history) of the Asset. Note that in some embodiments, the Ownership Registry can be contained within the Contract itself. |

From one perspective, the invention described herein can be viewed as providing a generic technical mechanism for controlling exchanges on a blockchain. These exchanges may be financial exchanges relating to payments. The invention is directed towards the technical mechanism or vehicle which enables this exchange.

According to one perspective, the invention provides a technical arrangement to calculate, register and/or apportion costs and/or generate income in proportion to the current ownership of an asset. Thus, one benefit provided by the invention is that it allows the distribution or transfer of data representative of costs and income for an asset registered and maintained on the Blockchain. In turn, this increases the capability of such assets to meet the real-world needs of various entities such as the asset itself and investing parties.

Recent research into blockchain applications includes explorations into mechanisms for creating and using what are known as 'smart contracts,' and how these can be monitored and managed against the Blockchain. One possibility is to use the smart contract to represent an asset where the ownership of that asset can be split amongst a number of other entities. That ownership can then be transferred securely between entities using the blockchain as the vehicle of transfer.

In some cases, assets confer the right to income that is generated. Additionally or alternatively, an asset can bind the holder to certain cost obligations. The present invention presents a generic mechanism to allow a value such as the costs accrued against the asset, or income generated from it, to be exchanged via a blockchain.

Key elements of the Invention:

Some elements of the present invention are as follows:

A technical solution and technique for determining events (triggers) which generate income payable to owners of a Blockchain-based asset, A technical solution and technique for determining events (triggers) which generate costs payable by owners of a Blockchain-based asset, A technical solution and technique for calculating and allocating income/costs to owners of Blockchain-based assets based on a set of pre-defined rules, A technical solution and technique for generating and signing the bitcoin transactions to execute the income/costs payments.

The processing is controlled by a hierarchy of Agents, as illustrated in FIG. 1. These Agents may be computer-based resources which execute in parallel to the blockchain. They can be suitably programmed to monitor the state of the blockchain, respond to the outcome of tests and conditions, and/or can receive inputs from off-block sources. See section below entitled "Illustrative Computing Agent for use with the invention" for an example of how such an Agent may be implemented.

In the example described herein the following assumptions are made. However, it will be appreciated that this example does not limit the variations possible on the underlying method:

There is one Master Agent per contract (i.e. per asset). There may be several subordinate Agents that perform discrete functions.

The Master Agent manages and 'authorises' all the subordinate Agents.

The sub-ordinate agents for this invention include a combination of one or more of the following types of Agents:

one or more Income Agents, responsible for processing the Income generated from an asset;

one or more Cost Agents, responsible for processing the costs generated from an asset optionally, one or more Netting Agents, responsible for netting off income against payments where applicable;

one or more Notification Agents, responsible for alerting share owners of various events such as income payments made; cost payments due; events affecting or relating to the asset; or any other notification;

any other type of Agent that performs a necessary or optional discrete function

The operation of the Agents is rule-based and may follow any pre-defined set of rules. The rules are determined in accordance with the requirements of the task to be performed. In accordance with the present invention the Master Agent manages all the other Agents. An example of the hierarchy and possible flow of control and processing may be as follows:

The Master Agent authorises the Income/Cost Agents to perform their tasks, e.g.:

The Master Agent monitors all triggers, or

Subordinate-Agents monitor triggers and seek authority from the Master Agent to process, or Subordinate-Agents are pre-authorised to monitor and perform their tasks, or Any combination or the above.

The output(s) and control from the Income/Cost Agents are passed to the Master Agent.

The Master Agent engages the Netting Agent (passing it data from the Income/Cost Agent)

The Netting Agent passes output to the Master Agent

The Master Agent authorises transaction broadcasts (either it does the broadcast itself, or it authorises the sub-ordinate agents to broadcast or a combination, etc.).

There now follows an outline of the key requirements for an embodiment of the invention.

Determining Current Ownership

In order to apportion costs/income against an asset it is essential to be able to determine the current ownership of that asset. In accordance with an embodiment of the invention, details pertaining to the current owners are maintained in a registry (public or private, distributed or centralised). The registry may contain the respective owners' public keys which are associated with a redeem script hash that can be identified within an unspent blockchain transaction (UTXO). The UTXO indicates the number of shares owned by each public key. In addition, other information may be stored such as email address and so on.

Calculating and Paying Costs:

In order to accrue costs to the ownership of the asset:

The asset must have the ability to determine its current ownership;

The asset must be able to determine the total costs/income for a given time period;

The asset must be able to divide the costs/income between the current ownership; and The asset must be capable of triggering the payment of those costs/income from/to the current asset holders. Payment will be performed by generating a blockchain transaction to exchange some value between parties.

Payment rules may be simple or complex depending on the type of asset and the type of income, providing the required input data and/or parameters are available. For example, an income rule could be to pay each owner a share of the total income according to their current proportion of ownership. In another example, each owner might be due a share of income based on their proportion of ownership over the time period in which the income accrued. In another example, a 'bonus' might be paid for holding the share ownership for a given length of time. These examples are illustrative only and do not limit the number or types of different payment rules that can be set up.

Contract enforcement (e.g. recovery of unpaid costs) can be achieved in several ways, some of which can be controlled automatically (again by using computing Agents) or by non-automated means. For example:

Legal redress;

Reallocation of the ownership of the asset (although only possible if the issuer is required to counter-sign asset re-allocation); and Blocking payment of income until the costs have been recovered.

Other Functionality

Other (optional) functionality may be built by designing Agents and setting up rules accordingly. Illustrative but non-exhaustive examples may include:

The asset may be capable of netting costs from the income;

The asset may be capable of holding income where previous costs have not been paid;

This income/costs/net may be rolled up at the end of a time-period (e.g. every six months) or as it is generated (e.g. immediately).

Technical Model

The technical solution presented herein provides a blockchain-based mechanism for the control of an asset via the use of a computing Agent and a smart contract. The invention enables the automated generation of a set of blockchain transactions. These transactions can be used for payments to either re-coup costs or pay income related to performance of the smart contract. FIG. 1 shows an overview of a system in accordance with an embodiment of the invention, including components which can be arranged to implement the architecture of the system.

Costs Agent

The Costs Agent, once the trigger condition is satisfied, will:

Calculate the total payment due for the asset as a whole;

Calculate the individual payments across the current ownership split for the asset based on the payment rules defined within the contract e.g. pro-rata; and Calculate the individual payments across the current ownership split for the asset based on the payment rules defined within the contract e.g. pro-rata; and Create payment transactions for each of the individual asset holders.

There can be more than one Income Agent defined against a given contract if required (for example: one for periodic income, and one for ad-hoc income).

Netting Agent

The Netting Agent, once the trigger condition is satisfied, will:

Consolidate payment transactions into a single net transaction from multiple individual ones where the payment addresses match.

In the example provided herein, there is only a single netting contract. However, it is important to note that the invention is not limited in this regard. In one or more embodiments, there may be multiple netting agents. In such cases, each instance is provided with a clearly defined, distinct set of rules.

Determining the Current Ownership Split

The embodiment described herein assumes that the current ownership for the asset can be determined by a combination of a registry (or database) and the UTXO list. The term "UTXO list" is known in the art and refers to a list of transaction outputs on the blockchain which have not yet been spent.

Figure 2:
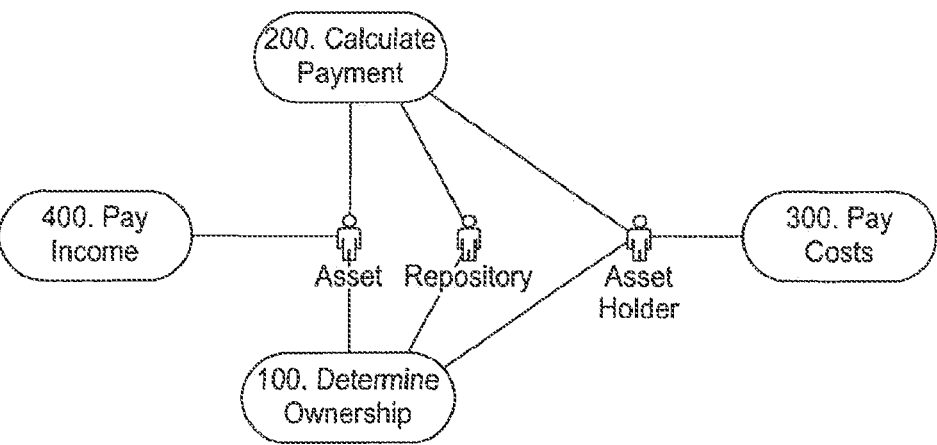
FIG. 2 shows some illustrative use cases which may be utilised in relation to the invention.

FIG. 2 shows some key use cases related to the technical model described herein. These are now explained in more detail as follows.

Determination of Ownership [100]

It should be noted that the following example assumes that the action is performed directly by the asset itself. However, in other embodiments this actor may be replaced with some other asset controller using the same process. In this use case, the Asset needs to determine its current ownership in order to facilitate a payment.

TABLE 1

| Step | Details |
|---|---|
| 100.10 | From the Ownership Registry associated with the Contract the Agent process can determine: The ownership for the asset within the given period; and The share in the asset for each owner. |

Create payment transactions for each of the individual asset holders.

There can be more than one Costs Agent defined against a given contract if required e.g. one for periodic costs, and one for ad-hoc costs.

Income Agent

The Income Agent, once the trigger condition trips, will:

Calculate the total payment due for the asset as a whole;

Payment Calculation [200]

Again, the primary actor in this example use case is the Asset. However, in other embodiments the Asset may be replaced by another primary actor. In the present use case of payment calculation, the Asset wishes to calculate the amount of income and/or costs that it should pay or collect from its current owners (as determined in use case 100 above).

TABLE 2

| Step | Details |
|---|---|
| 200.10 | Depending on the Agent, the Asset pulls in all the information for the specified period to calculate the income due or it pulls in all the information for the period to calculate the costs due. Note: a given Agent will only calculate costs or income, not both. Note: the mechanism used will be specific to the nature of the asset itself and formally defined within the associated contract document. |

TABLE 2-continued

| Step | Details |
| --- | --- |
| 200.20 | The outputs from 200.10 is then apportioned to the shares according to the contract. |
| | For example, by dividing the output value with the number of shares in existence and then defining the proportion based on the time held within the period (although there is nothing to stop the Contract providing more complexity over the allocation rules). |
| | The rounding rules will tend to be defined within the associated contract document but will normally be down for income due and up for costs due. |
| 200.30 | The per-unit apportionment derived in step 200.40 is now allocated on a per-holding basis through a simple multiplication using the holding allocation derived in use case 100. |
| 200.40 | Where costs need to be recovered, use case 300 is now performed for each individual holding. |
| 200.50 | Where income needs to be paid, use case 400 is now performed for each individual holding. |

Pay Costs [300]

Again, the primary actor in this example is the Asset. An Asset Holder wishes to pay costs incurred as a result of ownership of the asset.

TABLE 3

| Step | Details |
| --- | --- |
| 300.10 | In this situation, the Asset generates a transaction that it will pass to the Asset Holder for the asset holder to add the required transaction inputs, and then sign to complete the transaction. |
| 300.20 | The Asset creates a partially formed transaction with: |
| | No transaction inputs; and |
| | One transaction outputs. |
| | The transaction output is: |
| | The cost transaction paid to the Asset's public key hash address. |
| | However, the signature applied by the Asset is marked as SIGHASH_ALL \| SIGHASH_ANYONECANPAY which prevents the outputs being changed, but does allow an additional transaction input to be applied. |
| 300.30 | The Asset sends this transaction to the Asset Holder to complete. |
| 300.40 | The Asset Holder will then create a transaction in order to generate a transaction output of the right size for this transaction plus the mining fee. |
| 300.50 | The Asset Holder will then use the transaction output from step 300.30 as an additional input to the transaction generated in 300.20. |
| | They will then sign and submit this transaction. |

Considerations:

It is noted that there is no particular incentive for the Asset Holder to pay their proportion of the costs. In the process defined above, there is redress possible through two routes:

Subsequent income could be withheld if the costs are not paid. This would need to be defined within the contract (and assumes that there is income being generated against the asset), but is simple to detect within step 100.10

Legal redress through the relevant legal channels.

It is possible to create a contract such that there are notaries on the issuance contract such that if the Asset Holder does not pay, then their asset ownership is revoked back to the asset itself using a standard m of n multi-signature transaction. In this situation:

After step 300.20 is performed, a second transaction is created with a locktime set based on the time allowed to pay the costs. This takes the transaction input of the last transaction issuance, but assigns the assets back to the Asset. This transaction is signed by the relevant notaries.

If the Asset Holder pays their costs, then this transaction is invalid (as the transaction input has already been used) but if they do not, then the asset ownership is revoked. As the payment transaction effectively re-issues the shares with the asset, this transaction cannot be rolled-over to the next period but rather two transactions must be created whenever a cost transaction is created.

Variant 1:

The above example assumes that the costs are paid in Bitcoin. However, there is no requirement for this to be the case as any tokenised value can be used. In this situation, the following changes are required:

Step 300.50 adds two transaction inputs rather than simply the one. The first is the mining fee in BTC and the second is the tokenised cost transaction (for example in fiat currency).

Variant 2:

The above example assumes that the mining fee is paid by the Asset Holder (along with the other costs). There is no requirement for this to be the case. Should the mining fee be paid by the Asset itself, the following changes are required:

Step 300.20 creates two transaction inputs; the asset issuance one plus a BTC one for the mining fee.

Variant 3:

Rather than create a cost transaction per asset holder, a single cost transaction is created and each individual asset holder adds their input (rather than a separate transaction per asset holder). The transaction output is the total value of the costs due with the details of the amount per asset holder informed through an alternative route.

Whilst this model works for simple splits, and relatively low number of asset holders, it is impractical in many cases because the transaction is only valid when all the owners agree to pay. From the asset's point of view, in a situation where it is expected that payment may be delayed or not made by a number of the asset holders, then Variant 3 is preferred in that it maximises the amount of income received in the shortest possible time.

The actual variant used for payments can be controlled via the Master Agent, based on a pre-defined set of rules, which may be embedded (hard-coded) with the Master Agent or may be located on a separate look-up table. For example, a rule may govern which variant to use based on a simple Boolean flag, or may involve a threshold number of owners or any other suitable testable condition.

Pay Income [400]

Again, in this example the primary actor is the Asset. The Asset wishes to pay income to its owners in proportion to their ownership.

TABLE 4

| Step | Details |
| --- | --- |
| 400.10 | The Asset generates a transaction with one transaction input and one transaction output for each asset holder. The transaction input is: Total income distribution amount plus the mining fee. There is one transaction output for each current investor, structured as follows: Transaction income distribution input paid to the Asset Holder's public key hash |

Variant:

This is a consideration where the income is being paid in a tokenised form, not native BTC. In this situation, the transaction income transaction is assigned to a redeem script address comprising:

The asset holder's public key; and

The metadata associated with the income distribution.

Example Scenario—Racehorse

An example scenario is now provided for the purposes of illustrating a workable implementation of the invention. The individual transaction sequence for the scenario is provided within the accompanying figures.

In this illustrative scenario, a stable chooses to issue shares in a racehorse, with associated rights to winnings and obligations to pay upkeep such as stable fees, etc. In the example the stable retains ownership of 50% while Alice purchases 30% and Bob 20%.

As a contractual obligation, owners must register their details with the Issuer (the Stable). This might be simply a public key for bitcoin payments (i.e. a BTC Address). It might however, also include an email address for notifications, a full name, date of birth, a residential/business address, a tax file number, etc. Any of these may be a contractual requirement or an option depending on the Issuer's own processing requirements and/or any regulations the Issuer may or may not feel bound to observe.

Depending on the Issuer's desires, the contract token (i.e. the bitcoin transactions containing the metadata) may require the Issuer's signature for all transfers of ownership (i.e. in a 'web-of-trust' situation) or (as in this example) may be allowed to be transferred without Issuer signature. In the latter case, by the Terms and Conditions of the contract, the new owner must contact the Issuer to register their ownership (see clause 1.1).

These registered details are stored within the contract itself and relies on the hash of the contract excluding modifiable fields (such as the ownership information).

Effectively, the hash against the contract is defined within the contract itself, which means that not all attributes of the contract needed to be included in the hash. This allows for the ownership list to be maintained within the contract document but the owners not be included within the hash. Therefore the signature of the document remains unchanged even if the owners of the document are changed.

Contract Summary

The following presents selected highlights of the human-readable version of the contract that contains the details about the two Agents that implement those clauses.

Naka's Revenge Title Contract

Issuer: Blockchain Stable Ltd.; hereafter 'the Stable'

Public Key: xxxxxxxxxxxxxxxxxxxxxxxxxxxxxxxxxx

This contract covers . . . <some content> . . . Part share of ownership of racehorse known as Naka's Revenge . . . <more content> . . .

Contract specifics

NumShares 10

ShareVal 10%

Pegging rate 1000 Satoshis/share

Clause 1: Ownership Registration 1.1 Ownership of shares will be determined as the most recently verifiable information on the public key owning the token. The Issuer accepts no responsibility for misdirecting income payments in cases where none of the following has been satisfied:

1.1.1 The Token has been signed by the Issuer or by an authorised signatory 1.1.2 The Token owner has proven ownership by presenting the relevant redeem script along with their signature.

1.1.3 Pursuant to subclauses 1.1.1 and/or 1.1.2 the owner information will be added to the Issuer's registry.

1.2 Pursuant to 1.1, where the owner wishes their public key to remain unrevealed to the Issuer and therefore absent from the Issuer's registry, the most recent registrant will be considered the 'Owner' and will remain subject to all obligations and entitlements.

Clause 3: Distribution of Income

The issuer will pay share owners a share of all winnings in direct proportion to their percentage ownership within 30 days of race day. Share owners are defined here as holders of this contract on race day.

Clause 7: Maintenance fees

Maintenance fees (all inclusive: stable fees; training; fodder; etc) are 1000 satoshis/day for the lifetime of this contract. Share owners agree to pay stable fees annually on 30 June in proportion to their ownership. Fees will accrue on a daily basis and will be transferred to new share owners in the event of a share transfer.

Clause 28: Terminations

This agreement terminates without prejudice immediately on any of the following conditions:

28.4 Death of the named racehorse

Issuance

The Stable first registers the Racehorse with its own private key. This could be a completely new private key, or it could use the mechanism substantially as described below in the section entitled "Method of sub-key generation" to derive it directly from the stable's own keys.

The Stable then needs to seed-fund the Racehorse's account for the issuance transaction which it does in STABLE-53-T1 (see FIG. 5).

The racehorse then issues shares in itself to the various asset holders in RACEHORSE-53-T1 (see FIG. 6). The issuance transaction allows free transfer of asset directly by the owner since the contract states that no winnings are due if the costs are outstanding (meaning that ownership is never directly revoked). Output 4 of this transaction creates a smart contract covering the racehorse itself allowing Clause 28 of the contract to be implemented.

Cost Agent (Stable Fees)

On a bi-annual basis, the Cost Agent responsible for billing the stable fees is triggered by the date. The costs are calculated as 1000 Satoshis/share/day (for the sake of simplicity, the example assumes that six months=180 days).

To improve the cash flow, the Agent creates separate transactions for each public key owner, with the owners' details taken from the asset registry associated with the underlying contract (or Issuer's own private internal database) and current share allocation taken from the Blockchain (based on the underlying BTC on the UTXO and the pegging rate specified on the contract). For details relating to pegging rates, see the section below regarding 'codification scheme'.

The high-level process for the Agent is:

Determine ownership from the Ownership Registry and relevant UTXO

In this example, this provides a list of Stable—5 (PubK-Stable), Alice—3 (PubK-Alice), Bob—2 (PubK-Bob)

Calculate the total costs due for the period;

In this example, this provides a total of 180,000 Satoshis

Determine the apportionment rules from the Contract;

In this example, only bill Alice (54,000 Satoshis) & Bob (36,000 Satoshis) and the Stable (90,000 Satoshis)

Create the payment transactions with no transaction inputs signed using the SIGHASH_ANYONECAN-PAY marker (to allow the transaction input to be added subsequently)

In this example, this is RACEHORSE-53-T2 and RACEHORSE-S3-T3

Wait for the payments to be published onto the Blockchain. The contract itself will instruct the agent(s) on how to behave when payment is not received; for example, if a payment is not received within 14 days, a reminder may be sent and after 60 days the account marked as in arrears Where the payment is subsequently received, update the monitoring agents to cease any further collection activities.

FIG. 7 shows the transaction relevant to this aspect of the example, wherein the first set of stable fees need to be claimed from the investors (6 months' worth for 180000 Satoshi/share). Since the money is repaid to the stable, the cost transaction is not generated back to the hidden owner (although if the stable was trying to 'hide' its share then it would be so that the public record on the Blockchain did not distinguish between owners). Because change cannot be provided to Alice or Bob, there is an assumed transaction to create the right sized transaction input (assumed to be ALICE-53-T1 & BOB-S3-T1)

Investor Payment of Costs

Upon receipt of the incomplete transaction, the investors (Alice and Bob) will allocate the correct transaction input to fulfil the fees and complete the transaction using their Bitcoin wallet. This adds the transaction input to the stubbed transaction RACEHORSE-S3-T2 (for Alice) and RACE-HORSE-S3-T3 (for Bob)—See FIG. 7.

Income Agent (Winnings)

The winnings accrued by the Racehorse are paid out once the stable receives payment from the racetrack. Depending on the situation, the winnings might be received in BTC (for example, if the racing industry has enabled bitcoin transactions, or if the particular racetrack has enabled winnings in bitcoin, etc.), or might be received in fiat currency. In the latter case the stable might perform a step to convert the winnings into BTC prior to performing the income distribution steps.

The high-level process for this Agent is:

Using the Contract determine how to accrue income for this investment

In this example, an external news feed is checked for details of the race results Communicate with the relevant parties (as defined within the Contract) about the funding requirement In this example, an e-mail is sent to the Stable containing an invoice to pay based on the winnings that they should receive on the Racehorse's behalf from the track Determine ownership from the Ownership Repository In this example, this provides a list of Stable—5 (PubK-Stable), Alice—3 (PubK-Alice), Bob—2 (PubK-Bob)

Wait for the income to be paid into the relevant account

In this example, the winnings of £20,400 comes to 80BTC is paid to the Public Key Hash address of the Racehorse Calculate how to split the winnings due for the period;

In this example, this provides a total of 8BTC/share

Determine the apportionment rules from the Contract;

In this example, Stable 40 BTC, Alice 24 BTC and Bob 16 BTC

Create the payment transaction(s) to pay the return

FIG. 8 shows a transaction in which the Racehorse passes the stable fees back to the stable. Note that if the stable was not keeping its ownership secret then it is possible to have the stable fees paid directly to the stable by simply using the stable's public key rather than the racehorse's one in S3-T2 through S3-T5

Other techniques and mechanisms which may be used in conjunction with the present invention are now discussed in more detail below.

Codification Scheme

The metadata in the blockchain transaction can be formatted in a variety of ways. However, one possible codification scheme is described here.

A contract is transferable if the rights it defines are conferred upon the holder or owner of the contract. An example of a non-transferable contract is one in which the participants are named—that is, where the rights are conferred upon a specific named entity rather than the holder of the contract. Only transferable contracts are discussed in this codification scheme.

A token represents a specific contract that details or defines rights conferred by a contract. A token can be a representation of the contract in the form of a bitcoin transaction.

This codification method uses metadata comprising three parameters or data items. This data may be indicative of:

i) an amount of shares available under the contract (this may be referred to herein as 'NumShares');

ii) a quantity of transfer units to be transferred from a sender to at least one recipient (this may be referred to herein as ShareVal'); and iii) a factor for calculating a value for the quantity of transfer units (this may be referred to herein as a 'pegging rate').

An advantage of this codification scheme is that it can be used to encapsulate or represent contracts as tokens on a blockchain using only the three parameters described above. In effect, the contract can be specified using a minimum of these three data items. As this codification scheme can be used for any type of transferable contract, common algorithms can be devised and applied. Further detail of these metadata items is provided as follows.

A divisible token is one in which the value on a transaction output may be subdivided into smaller amounts allocated across multiple tokens (i.e. allocated across multiple transactions). The archetype is tokenised fiat currency. Divisible contracts are defined as those that specify a non-zero PeggingRate. For divisible contracts the tokenised value transferred in the transaction output is tied to the underlying bitcoin (BTC) value via the PeggingRate. That is, the contract specifies the holder's rights in terms of a pegging-rate. For non-divisible tokens there is no PeggingRate and the contract specifies the holder's rights in terms of a fixed value (e.g. like a bearer bond: 'this contract is redeemable for exactly $1000' or a voucher 'this contract is redeemable for one haircut'). For non-divisible contracts the underlying transaction BTC value is irrelevant to the contract value.

The phrase "Underlying BTC value" refers to the bitcoin amount (BTC) attached to the transaction output. In the Bitcoin protocol every transaction output must have non-zero BTC amount to be considered valid. In fact, the BTC amount must be greater than a set minimum (known as 'dust') which, at the time of writing, is currently set to 546 satoshis. 1 bitcoin is defined as being equal to 100 million satoshis. As the bitcoin transactions are here used only as a means of facilitating an exchange of ownership, the actual underlying BTC amount is arbitrary: the true value lies in the contract specification. In theory every token could be carried by dust.

In accordance with the present codification scheme, specifically for divisible tokens, the underlying BTC value does have a meaning: it bears a relationship to the contract value via a PeggingRate. The PeggingRate is itself arbitrary and is chosen so as to keep the underlying BTC amount small. The reason for using a PeggingRate rather than simply underlying every token transaction with dust is because the protocol of the present invention facilitates divisibility: when a token is split into several transaction outputs of smaller amounts it is not necessary to adjust the original contract. Rather, the contract value of each subdivided token is simply calculated based on the PeggingRate and the subdivided amount of underlying BTC value.

A limited token is one in which a total issuance value is fixed (or 'limited') by a fixed non-zero number of shares as defined by a quantity called NumShares. Therefore, no further shares may be issued under a limited contract. For example a contract for part ownership of a race horse is limited to 100% of the race horse (e.g. 100 shares at 1% each or 10 shares at 10% each, etc.). An unlimited contract implies that the issuer is able to underwrite further issuances of shares, for example by adding the required amount of fiat currency into their Reserve Account. NumShares must be explicitly stated on all contracts. Limited contracts must have NumShares>0; unlimited contracts are denoted by setting NumShares=0.

The archetypical example is a currency reserve (analogous to a gold reserve) such that the total value held in the reserve bank account matches the total value in promissory notes in existence (i.e. unredeemed tokens). This concept extends beyond currency reserves to include stock inventory. For example, an issuer of licensed printed t-shirt tokens may start with an inventory of 10,000 T-shirts in stock and may issue a divisible token to represent those 10,000 t-shirts (where, say, each share=1 t-shirt). The original token could be subdivided and each subdivided token would be redeemable for a number of t-shirts according to the transaction output's underlying BTC value as defined by the PeggingRate. If demand increases, however, the issuer may decide to issue further shares (i.e. increase the number of shares in circulation by (say) another 10,000). In such cases it is incumbent on the issuer to deposit a further 10,000 t-shirts into his reserve account (i.e. stock warehouse) in order to underwrite the further issuance. Thus, the total number of t-shirts in stock (where stock acts as 'reserve account') at any one time=the total number of unredeemed shares.

PeggingRates only apply to divisible contracts, wherein the value of a share (represented by a quantity called ShareVal) is pegged to the underlying BTC amount. For example, the contract might specify that the issuer promises to redeem the token at a rate of $10,000 for every underlying 1 BTC. That would mean (for example) that a transaction with a tokenised underlying output value of 15,400 satoshis would be redeemable for $1.54. A value of 0 for the PeggingRate indicates that the contract is non-divisible (i.e. can only be transferred whole, like a bearer bond). When the PeggingRate is set to 0 (meaning non-divisible token) the underlying BTC value is not relevant to the contract value and can be set at any amount. Normally in this case it is desirable to keep the underlying BTC amount as small as possible (i.e. set to dust) to minimise operating costs.

NumShares is the total (fixed) number of shares available under the (Limited) contract. For limited contracts NumShares must be a whole number greater than zero. For unlimited contracts NumShares is not fixed as more shares can be issued at any time (provided they are underwritten), which is denoted by setting the value to 0.

A share is defined as the unit of transfer and the ShareVal is the value of that unit. For example, for fiat currency, the unit of transfer may be set to 1 cent. Or, for example, it may be set to 50 cents, in which case transfers may only be executed in 'lots' of 50 cents. ShareVal may also be expressed as a percentage: for example if a breeder wants to sell a racehorse in 10 equal shares then the ShareVal=10%. ShareVal must be >0 and must be defined on the contract.

TotalIssuance represents the total value of shares issued. This value only relates to limited contracts as for unlimited contracts the issuance is not fixed and more shares may be issued. If the shares are expressed as a percentage then the TotalIssuance=100% by definition.

For limited contracts NumShares, ShareVal, and TotalIssuance are related in the following way:

$$NumShares \times ShareVal = TotalIssuance.$$

A value of 0 for TotalIssuance implies it is an unlimited contract. An example of an unlimited contract is fiat currency (so TotalIssuance is set to 0); examples of limited contracts are: (i) limited edition commemorative coins (1000 minted, where 1 share=1 coin): TotalIssuance=1000× 1=1000 coins; and (ii) seats at a ticketed venue, where TotalIssuance=total number of seats available.

The circulation is defined as the total value of unspent tokens (i.e. as determined by transactions in UTXO—unspent transaction output). The full set of all unspent transactions is kept in a list available to all bitcoin nodes. For example, if an issuer initially issues $10,000 as fiat currency type tokens and over time $5500 worth of tokens are redeemed, then the circulation=$4500 (being the value of unredeemed tokens). This value should reconcile to the balance in the associated reserve account.

Method of Sub-Key Generation

The above description refers to situations where it is advantageous to generate a sub-key from an original (master) key. A method for achieving this is now provided for illustration of one way in which this could be performed. The following description is provided with reference to FIGS. 12 to 18.

Figure 12:
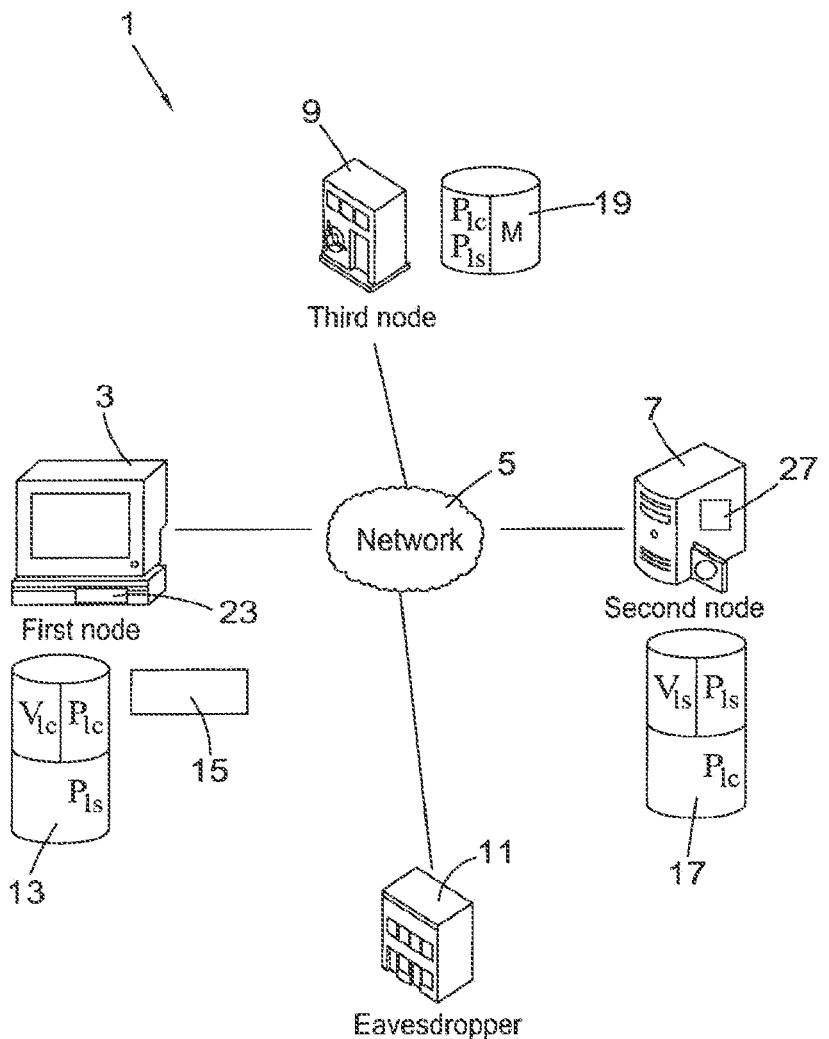
Figure 13:
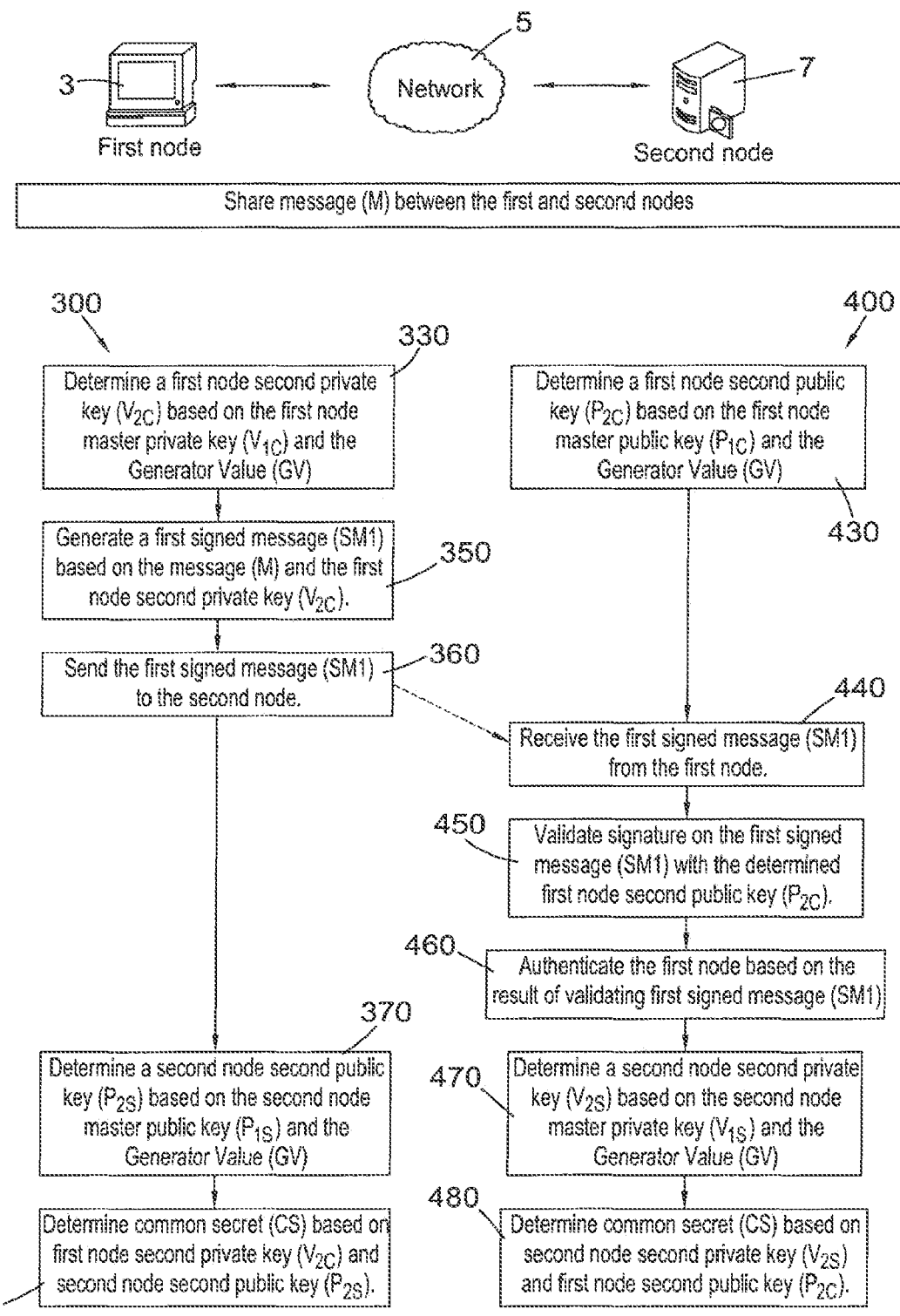

FIG. 12 illustrates a system 1 that includes a first node 3 which is in communication with a second node 7 over a communications network 5. The first node 3 has an associated first processing device 23 and the second node 5 has an associated second processing device 27.

The first and second nodes 3, 7 may include an electronic device, such as a computer, phone, tablet computer, mobile communication device, computer server etc. In one example, the first node 3 may be a client (user) device and the second node 7 may be a server. The server may be a digital wallet provider's server.

The first node 3 is associated with a first asymmetric cryptography pair having a first node master private key ($V_{1C}$) and a first node master public key ($P_{1C}$). The second node (7) is associated with a second asymmetric cryptography pair having a second node master private key ($V_{1S}$) and a second node master public key ($P_{1S}$). In other words, the first and second nodes are each in possession of respective public-private key pairs.

The first and second asymmetric cryptography pairs for the respective first and second nodes 3, 7 may be generated during a registration process, such as registration for a wallet. The public key for each node may be shared publicly, such as over communications network 5.

To determine a common secret (CS) at both the first node 3 and second node 7, the nodes 3, 7 perform steps of respective methods 300, 400 without communicating private keys over the communications network 5.

The method 300 performed by the first node 3 includes determining 330 a first node second private key ($V_{2C}$) based on at least the first node master private key ($V_{1C}$) and a Generator Value (GV). The Generator Value may be based on a message (M) that is a shared between the first and second nodes, which may include sharing the message over the communications network 5 as described in further detail below. The method 300 also includes determining 370 a second node second public key ($P_{2S}$) based on at least the second node master public key ($P_{1S}$) and the Generator Value (GV). The method 300 includes determining 380 the common secret (CS) based on the first node second private key ($V_{2C}$) and the second node second public key ($P_{2S}$).

Importantly, the same common secret (CS) can also be determined at the second node 7 by method 400. The method 400 includes determining 430 a first node second public key ($P_{2C}$) based on the first node master public key ($P_{1C}$) and the Generator Value (GV). The method 400 further include determining 470 a second node second private key ($V_{2S}$) based on the second node master private key ($V_{1S}$) and the Generator Value (GV). The method 400 includes determining 480 the common secret (CS) based on the second node second private key ($V_{2S}$) and the first node second public key ($P_{2C}$).

The communications network 5 may include a local area network, a wide area network, cellular networks, radio communication network, the internet, etc. These networks, where data may be transmitted via communications medium such as electrical wire, fibre optic, or wirelessly may be susceptible to eavesdropping, such as by an eavesdropper 11. The method 300, 400 may allow the first node 3 and second node 7 to both independently determine a common secret without transmitting the common secret over the communications network 5.

Thus one advantage is that the common secret (CS) may be determined securely and independently by each node without having to transmit a private key over a potentially unsecure communications network 5. In turn, the common secret may be used as a secret key (or as the basis of a secret key).

The methods 300, 400 may include additional steps. See FIG. 13. The method 300 may include, at the first node 3, generating a signed message (SM1) based on the message (M) and the first node second private key ($V_{2C}$). The method 300 further includes sending 360 the first signed message (SM1), over the communications network, to the second node 7. In turn, the second node 7 may perform the steps of receiving 440 the first signed message (SM1). The method 400 also includes the step of validating 450 the first signed message (SM1) with the first node second public key ($P_{2C}$) and authenticating 460 the first node 3 based on the result of validating the first signed message (SM1). Advantageously, this allows the second node 7 to authenticate that the purported first node (where the first signed message was generated) is the first node 3. This is based on the assumption that only the first node 3 has access to the first node master private key ($V_{1C}$) and therefore only the first node 3 can determine the first node second private key ($V_{2C}$) for generating the first signed message (SM1). It is to be appreciated that similarly, a second signed message (SM2) can be generated 462 at the second node 7 and sent 464 to the first node 3 such that the first node 3 can receive 372 the second signed message (SM2), validate 374 a signature associated with the second node 7, and authenticate 376 the second node 7, such as in a peer-to-peer scenario.

Sharing the message (M) between the first and second nodes may be achieved in a variety of ways. In one example, the message may be generated at the first node 3 which is then sent, over the communications network 5, the second node 7. Alternatively, the message may be generated at the second node 7 and then sent, over the communications network 5, to the second node 7. In some examples, the message (M) may be public and therefore may be transmitted over an unsecure network 5. One or more messages (M) may be stored in a data store 13, 17, 19. The skilled person will realise that sharing of the message can be achieved in a variety of ways.

Advantageously, a record to allow recreation of the common secret (CS) may be kept without the record by itself having to be stored privately or transmitted securely.

Method of Registration 100, 200

An example of a method of registration 100, 200 will be described with reference to FIG. 14, where method 100 is performed by the first node 3 and method 200 is performed by the second node 7. This includes establishing the first and second asymmetric cryptography pairs for the respective first and second nodes 3, 7.

The asymmetric cryptography pairs include associated private and public keys, such as those used in public-key encryption. In this example, the asymmetric cryptography pairs are generated using Elliptic Curve Cryptography (ECC) and properties of elliptic curve operations.

In the method 100, 200, this includes the first and second nodes agreeing 110, 210 on a common ECC system and using a base point (G). (Note: the base point could be referred to as a Common Generator, but the term 'base point' is used to avoid confusion with the Generator Value GV). In one example, the common ECC system may be based on secp256K1 which is an ECC system used by Bitcoin. The base point (G) may be selected, randomly generated, or assigned.

Turning now to the first node 3, the method 100 includes settling 110 on the common ECC system and base point (G). This may include receiving the common ECC system and base point from the second node 7, or a third node 9. Alternatively, a user interface 15 may be associated with the first node 3, whereby a user may selectively provide the common ECC system and/or base point (G). In yet another alternative one or both of the common ECC system and/or base point (G) may be randomly selected by the first node 3. The first node 3 may send, over the communications network 5, a notice indicative of using the common ECC system with a base point (G) to the second node 7. In turn, the second node 7 may settle 210 by sending a notice indicative of an acknowledgment to using the common ECC system and base point (G).

The method 100 also includes the first node 3 generating 120 a first asymmetric cryptography pair that includes the first node master private key ($V_{1C}$) and the first node master public key ($P_{1C}$). This includes generating the first master private key ($V_{1C}$) based, at least in part, on a random integer in an allowable range specified in the common ECC system. This also includes determining the first node master public key ($P_{1C}$) based on elliptic curve point multiplication of the first node master private key ($P_{1C}$) and the base point (G) according to the formula:

$$P_{1C}=V_{1C}\times G \qquad \text{(Equation 1)}$$

Thus the first asymmetric cryptography pair includes:
$V_{1C}$: The first node master private key that is kept secret by the first node.
$P_{1C}$: The first node master public key that is made publicly known.

The first node 3 may store the first node master private key ($V_{1C}$) and the first node master public key ($P_{1C}$) in a first data store 13 associated with the first node 3. For security, the first node master private key ($V_{1C}$) may be stored in a secure portion of the first data store 13 to ensure the key remains private.

Figure 14:
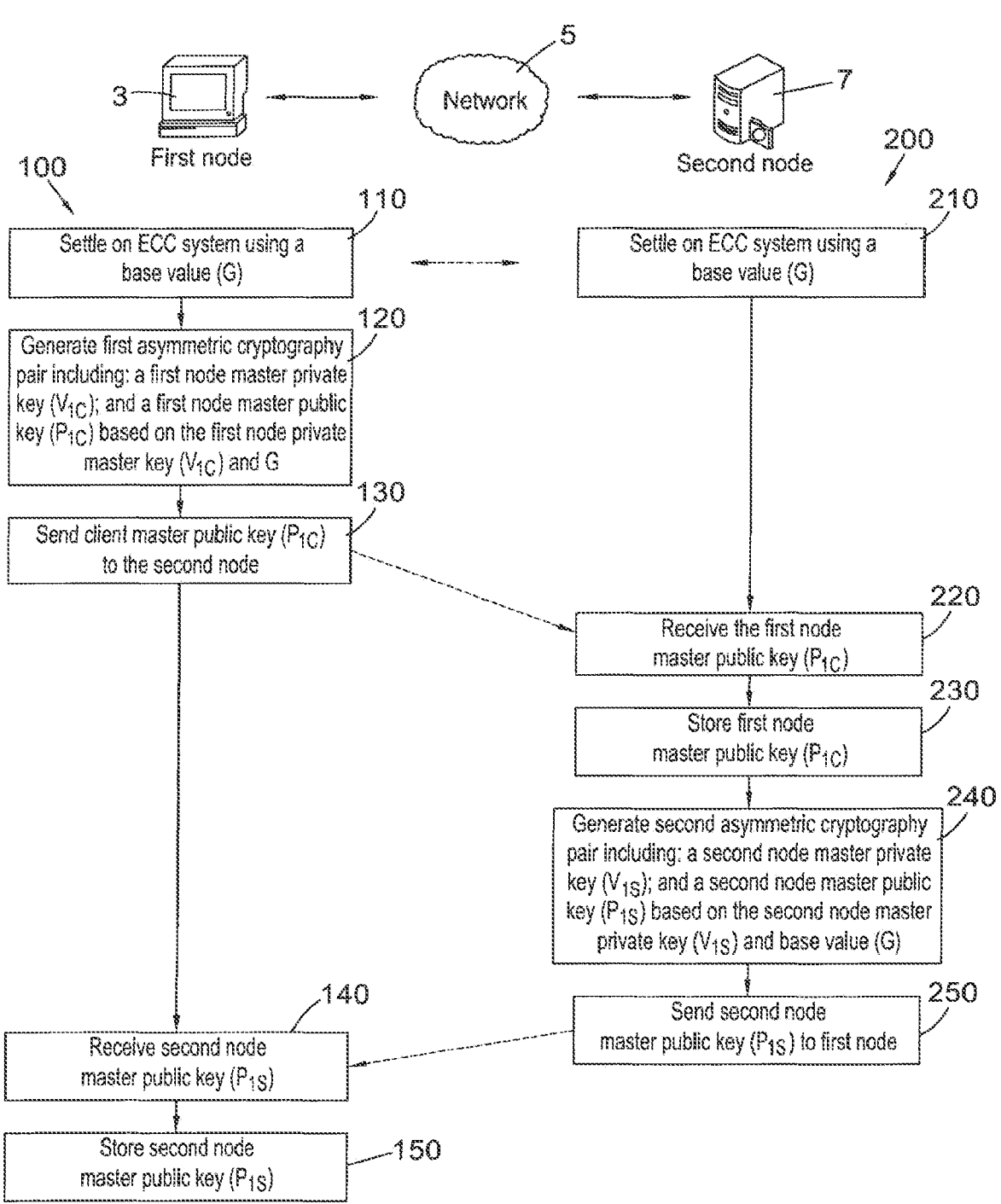

The method 100 further includes sending 130 the first node master public key ($P_{1C}$), over the communications network 5, to the second node 7, as shown in FIG. 14. The second node 7 may, on receiving 220 the first node master public key ($P_{1C}$), store 230 the first node master public key ($P_{1C}$) in a second data store 17 associated with the second node 7.

Similar to the first node 3, the method 200 of the second 7 includes generating 240 a second asymmetric cryptography pair that includes the second node master private key ($V_{1S}$) and the second node master public key ($P_{1S}$). The second node master private key ($V_{1S}$) is also a random integer within the allowable range. In turn, the second node master public key ($P_{1S}$) is determined by the following formula:

$$P_{1S}=V_{1S}\times G \qquad \text{(Equation 2)}$$

Thus the second asymmetric cryptography pair includes:
$V_{1S}$: The second node master private key that is kept secret by the second node.
$P_{1S}$: The second node master public key that is made publicly known.

The second node 7 may store the second asymmetric cryptography pair in the second data store 17. The method 200 further includes sending 250 the second node master public key ($P_{1S}$) to the first node 3. In turn, the first node 3 may receive 140 and stores 150 the second node master public key ($P_{1S}$).

It is to be appreciated that in some alternatives, the respective public master keys may be received and stored at a third data store 19 associated with the third node 9 (such as a trusted third party). This may include a third party that acts as a public directory, such as a certification authority. Thus in some examples, the first node master public key ($P_{1C}$) may requested and received by the second node 7 only when determining the common secret (CS) is required (and vice versa).

The registration steps may only need to occur once as an initial setup.

Session Initiation and Determining the Common Secret by the First Node 3

Figure 15:
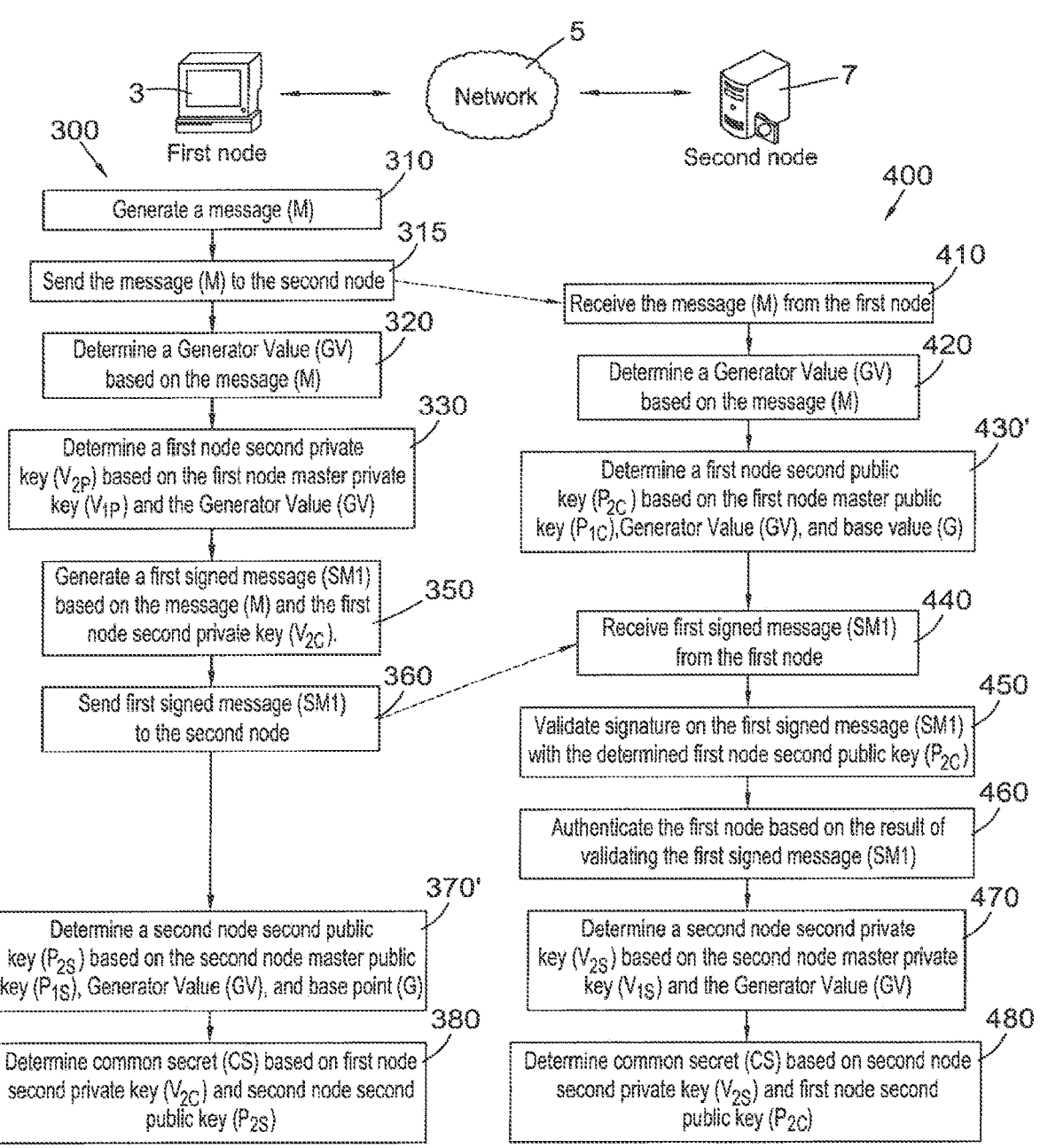
Figure 16:
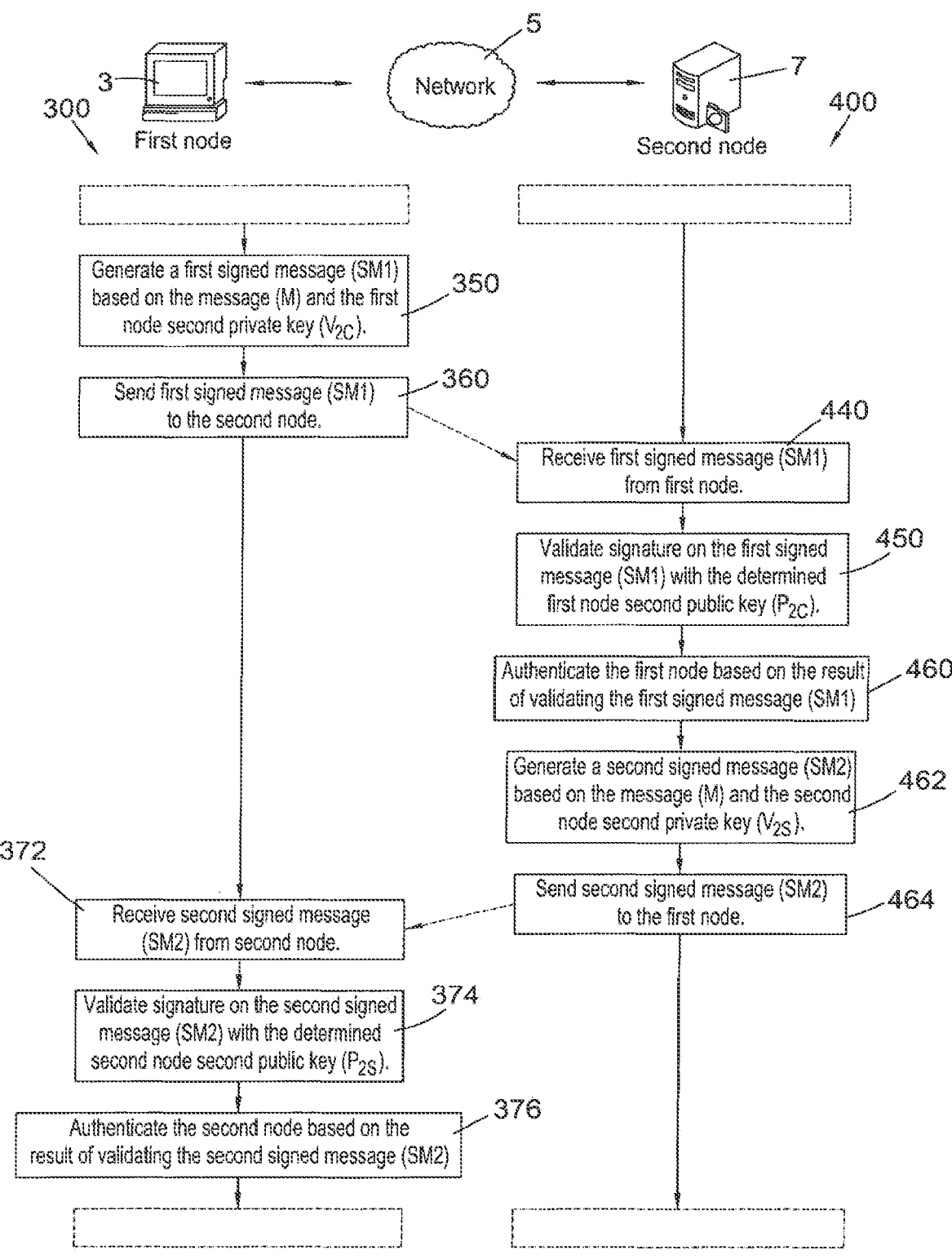

An example of determining a common secret (CS) will now be described with reference to FIG. 15. The common secret (CS) may be used for a particular session, time, transaction, or other purpose between the first node 3 and the second node 7 and it may not be desirable, or secure, to use the same common secret (CS). Thus the common secret (CS) may be changed between different sessions, time, transactions, etc.

The following is provided for illustration of the secure transmission technique which has been described above.

Generating a Message (M) 310

In this example, the method 300 performed by the first node 3 includes generating 310 a message (M). The message (M) may be random, pseudo random, or user defined. In one example, the message (M) is based on Unix time and a nonce (and arbitrary value). For example, the message (M) may be provided as:

$$\text{Message}(M)=\text{UnixTime}+\text{nonce} \qquad \text{(Equation 3)}$$

In some examples, the message (M) is arbitrary. However it is to be appreciated that the message (M) may have selective values (such as Unix Time, etc) that may be useful in some applications.

The method 300 includes sending 315 the message (M), over the communications network 3, to the second node 7. The message (M) may be sent over an unsecure network as the message (M) does not include information on the private keys.

Determining a Generator Value (GV) 320

The method 300 further includes the step of determining 320 a Generator Value (GV) based on the message (M). In this example, this includes determining a cryptographic hash of the message. An example of a cryptographic hash algorithm includes SHA-256 to create a 256-bit Generator Value (GV). That is:

$$GV=\text{SHA-256}(M) \qquad \text{(Equation 4)}$$

It is to be appreciated that other hash algorithms may be used. This may include other has algorithms in the Secure Hash Algorithm (SHA) family. Some particular examples include instances in the SHA-3 subset, including SHA3-224, SHA3-256, SHA3-384, SHA3-512, SHAKE128, SHAKE256. Other hash algorithms may include those in the RACE Integrity Primitives Evaluation Message Digest (RIPEMD) family. A particular example may include RIP-EMD-160. Other hash functions may include families based on Zémor-Tillich hash function and knapsack-based hash functions.

Determining a First Node Second Private Key 330

The method 300 then includes the step 330 of determining 330 the first node second private key ($V_{2C}$) based on the second node master private key ($V_{1C}$) and the Generator Value (GV). This can be based on a scalar addition of the first node master private key ($V_{1C}$) and the Generator Value (GV) according to the following formula:

$$V_{2C}=V_{1C}+GV \qquad \text{(Equation 5)}$$

Thus the first node second private key ($V_{2C}$) is not a random value but is instead deterministically derived from the first node master private key. The corresponding public key in the cryptographic pair, namely the first node second public key ($P_{2C}$), has the following relationship:

$$P_{2C}=V_{2C}\times G \qquad \text{(Equation 6)}$$

Substitution of $V_{2C}$ from Equation 5 into Equation 6 provides:

$$P_{2C}=(V_{1C}+GV)\times G \qquad \text{(Equation 7)}$$

where the '+' operator refers to elliptic curve point addition. Noting that elliptic curve cryptography algebra is distributive, Equation 7 may be expressed as:

$$P_{2C}=V_{1C}\times G+GV\times G \qquad \text{(Equation 8)}$$

Finally, Equation 1 may be substituted into Equation 7 to provide:

$$P_{2C}=P_{1C}+GV\times G \qquad \text{(Equation 9.1)}$$

$$P_{2C}=P_{1C}+SHA\text{-}256(M)\times G \qquad \text{(Equation 9.2)}$$

Thus the corresponding first node second public key ($P_{2C}$) can be derivable given knowledge of the first node master public key ($P_{1C}$) and the message (M). The second node 7 may have such knowledge to independently determine the first node second public key ($P_{2C}$) as will be discussed in further detail below with respect to the method 400.

Generate a First Signed Message (SM1) Based on the Message and the First Node Second Private Key 350

The method 300 further includes generating 350 a first signed message (SM1) based on the message (M) and the determined first node second private key ($V_{2C}$). Generating a signed message includes applying a digital signature algorithm to digitally sign the message (M). In one example, this includes applying the first node second private key ($V_{2C}$) to the message in an Elliptic Curve Digital Signature Algorithm (ECDSA) to obtain the first signed message (SM1). Examples of ECDSA include those based on ECC systems with secp256k1, secp256r1, secp384r1, se3cp521r1.

The first signed message (SM1) can be verified with the corresponding first node second public key ($P_{2C}$) at the second node 7. This verification of the first signed message (SM1) may be used by the second node 7 to authenticate the first node 3, which will be discussed in the method 400 below.

Determine a Second Node Second Public Key 370'

The first node 3 may then determine 370 a second node second public key ($P_{2S}$). As discussed above, the second node second public key ($P_{2S}$) may be based at least on the second node master public key ($P_{1S}$) and the Generator Value (GV). In this example, since the public key is determined 370' as the private key with elliptic curve point multiplication with the base point (G), the second node second public key ($P_{2S}$) can be expressed, in a fashion similar to Equation 6, as:

$$P_{2S}=V_{2S}\times G \qquad \text{(Equation 10.1)}$$

$$P_{2S}=P_{1S}+GV\times G \qquad \text{(Equation 10.2)}$$

The mathematical proof for Equation 10.2 is the same as described above for deriving Equation 9.1 for the first node second public key ($P_{2C}$). It is to be appreciated that the first node 3 can determine 370 the second node second public key independently of the second node 7.

Determine the Common Secret 380 at the First Node 3

The first node 3 may then determine 380 the common secret (CS) based on the determined first node second private key ($V_{2C}$) and the determined second node second public key ($P_{2S}$). The common secret (CS) may be determined by the first node 3 by the following formula:

$$S=V_{2C}\times P_{2S} \qquad \text{(Equation 11)}$$

Method 400 Performed at the Second Node 7

The corresponding method 400 performed at the second node 7 will now be described. It is to be appreciated that some of these steps are similar to those discussed above that were performed by the first node 3.

The method 400 includes receiving 410 the message (M), over the communications network 5, from the first node 3. This may include the message (M) sent by the first node 3 at step 315. The second node 7 then determines 420 a Generator Value (GV) based on the message (M). The step of determining 420 the Generator Value (GV) by the second node 7 is similar to the step 320 performed by the first node described above. In this example, the second node 7 performs this determining step 420 independent of the first node 3.

The next step includes determining 430 a first node second public key ($P_{2C}$) based on the first node master public key ($P_{1C}$) and the Generator Value (GV). In this example, since the public key is determined 430' as the private key with elliptic curve point multiplication with the base point (G), the first node second public key ($P_{2C}$) can be expressed, in a fashion similar to Equation 9, as:

$$P_{2C}=V_{2C}\times G \qquad \text{(Equation 12.1)}$$

$$P_{2C}=P_{1C}+GV\times G \qquad \text{(Equation 12.2)}$$

The mathematical proof for Equations 12.1 and 12.2 is the same as those discussed above for Equations 10.1 and 10.2.

The Second Node 7 Authenticating the First Node 3

The method 400 may include steps performed by the second node 7 to authenticate that the alleged first node 3, is the first node 3. As discussed previously, this includes receiving 440 the first signed message (SM1) from the first node 3. The second node 7 may then validate 450 the signature on the first signed message (SM1) with the first node second public key ($P_{2C}$) that was determined at step 430.

Verifying the digital signature may be done in accordance with an Elliptic Curve Digital Signature Algorithm (ECDSA) as discussed above. Importantly, the first signed message (SM1) that was signed with the first node second private key ($V_{2C}$) should only be correctly verified with the corresponding first node second public key ($P_{2C}$), since $V_{2C}$ and $P_{2C}$ form a cryptographic pair. Since these keys are deterministic on the first node master private key ($V_{1C}$) and the first node master public key ($P_{1C}$) that were generated at registration of the first node 3, verifying first signed message (SM1) can be used as a basis of authenticating that an alleged first node sending the first signed message (SM1) is the same first node 3 during registration. Thus the second node 7 may further perform the step of authenticating (460) the first node 3 based on the result of validating (450) the first signed message—see FIG. 16.

The Second Node 7 Determining the Common Secret

The method 400 may further include the second node 7 determining 470 a second node second private key ($V_{2S}$) based on the second node master private key ($V_{1S}$) and the Generator Value (GV). Similar to step 330 performed by the first node 3, the second node second private key ($V_{2S}$) can be based on a scalar addition of the second node master private key ($V_{1S}$) and the Generator Value (GV) according to the following formulas:

$$V_{2S}=V_{1S}+GV \qquad \text{(Equation 13.1)}$$

$$V_{2S}=V_{1S}+\text{SHA-256}(M) \qquad \text{(Equation 13.2)}$$

The second node 7 may then, independent of the first node 3, determine 480 the common secret (CS) based on the second node second private key ($V_{2S}$) and the first node second public key ($P_{2C}$) based on the following formula:

$$S=V_{2S}\times P_{2C} \qquad \text{(Equation 14)}$$

Proof of the Common Secret (CS) Determined by the First Node 3 and Second Node 7

The common secret (CS) determined by the first node 3 is the same as the common secret (CS) determined at the second node 7. Mathematical proof that Equation 11 and Equation 14 provide the same common secret (CS) will now be described.

Turning to the common secret (CS) determined by the first node 3, Equation 10.1 can be substituted into Equation 11 as follows:

$$S=V_{2C}\times P_{2S} \qquad \text{(Equation 11)}$$

$$S=V_{2C}\times(V_{2S}\times G)$$

$$S=(V_{2C}\times V_{2S})\times G \qquad \text{(Equation 15)}$$

Turning to the common secret (CS) determined by the second node 7, Equation 12.1 can be substituted into Equation 14 as follows:

$$S=V_{2S}\times P_{2C} \qquad \text{(Equation 14)}$$

$$S=V_{2S}\times(V_{2C}\times G)$$

$$S=(V_{2S}\times V_{2C})\times G \qquad \text{(Equation 16)}$$

Since ECC algebra is commutative, Equation 15 and Equation 16 are equivalent, since:

$$S=(V_{2C}\times V_{2S})\times G=(V_{2S}\times V_{2C})\times G \qquad \text{(Equation 17)}$$

The Common Secret (CS) and Secret Key

The common secret (CS) may now be used as a secret key, or as the basis of a secret key in a symmetric-key algorithm for secure communication between the first node 3 and second node 7.

The common secret (CS) may be in the form of an elliptic curve point ($x_S$, $y_S$). This may be converted into a standard key format using standard publicly known operations agreed by the nodes 3, 7. For example, the $x_S$ value may be a 256-bit integer that could be used as a key for $AES_{256}$ encryption. It could also be converted into a 160-bit integer using RIP-EMD160 for any applications requiring this length key.

The common secret (CS) may be determined as required. Importantly, the first node 3 does not need to store the common secret (CS) as this can be re-determined based on the message (M). In some examples, the message(s) (M) used may be stored in data store 13, 17, 19 (or other data store) without the same level of security as required for the master private keys. In some examples, the message (M) may be publicly available.

However depending on some application, the common secret (CS) could be stored in the first data store (X) associated with the first node provided the common secret (CS) is kept as secure as the first node master private key ($V_{1C}$).

Advantageously, this technique can be used to determine multiple common secrets that may correspond to multiple secure secret keys based on a single master key cryptography pair.

Hierarchy of Generator Values (Keys)

For example, a series of successive Generator Values (GVs) may be determined, where each successive GV may be determined based on the preceding Generator Value (GV). For example, instead of repeating steps 310 to 370 and 410 to 470 to generate successive single-purpose keys, by prior agreement between the nodes, the previously used Generator Value (GV) can be rehashed repeatedly by both parties to establish a hierarchy of Generator Values. In effect, the Generator Value, based on the hash of a message (M), can be a next generation message (M') for the next generation of Generator Value (GV'). Doing this allows successive generations of shared secrets to be calculated without the need for further protocol-establishment transmissions, in particular transmission of multiple messages for each generation of common secrets. The next generation common secret (CS') can be computed as follows.

Firstly, both the first node 3 and the second node 7 independently determine the next generation of the Generator Value (GV'). This is similar to steps 320 and 420 but adapted with the following formulas:

$$M'=\text{SHA-256}(M) \qquad \text{(Equation 18)}$$

$$GV'=\text{SHA-256}(M') \qquad \text{(Equation 19.1)}$$

$$GV'=\text{SHA-256}(\text{SHA-256}(M)) \qquad \text{(Equation 19.2)}$$

The first node 3 may then determine the next generation of the second node second public key ($P_{2S}'$) and the first node second private key ($V_{2C}'$) similar to steps 370 and 330 described above, but adapted with the following formulas:

$$P_{2S}'=P_{1S}+GV'\times G \qquad \text{(Equation 20.1)}$$

$$V_{2C}'=V_{1C}+GV' \qquad \text{(Equation 20.2)}$$

The second node 7 may then determine the next generation of the first node second public key ($P_{2C}'$) and the second node second private key ($V_{2S}'$) similar to steps 430 and 470 described above, but adapted with the following formulas:

$$P_{2C}'=P_{1C}+GV'\times G \qquad \text{(Equation 21.1)}$$

$$V_{2S}'=V_{1S}+GV' \qquad \text{(Equation 21.2)}$$

The first node 3 and the second node 7 may then each determine the next generation common secret (CS'). In particular, the first node 3 determines the next generation common secret (CS') with the formula:

$$CS' = V_{2C}' \times P_{2S}' \qquad \text{(Equation 22)}$$

The second node 7 determines the next generation common secret (CS') with the formula:

$$CS' = V_{2S}' \times P_{2C}' \qquad \text{(Equation 23)}$$

Further generations (CS", CS'", etc.) can be calculated in the same way to create a chain hierarchy. This technique requires that both the first node 3 and the second node 7 keep track of the original Message (M) or the originally calculated Generator Value (GV), and to which node it relates. As this is publicly known information there are no security issues regarding the retention of this information. Accordingly, this information might be kept on 'hash tables' (linking hash values to public keys) and distributed freely across the network 5 (for example using Torrent). Furthermore, if any individual common secret (CS) in the hierarchy is ever compromised, this does not affect the security of any other common secrets in the hierarchy provided the private keys $V_{1C}$, $V_{1S}$ remain secure.

Tree Structure of Keys

Figure 17:
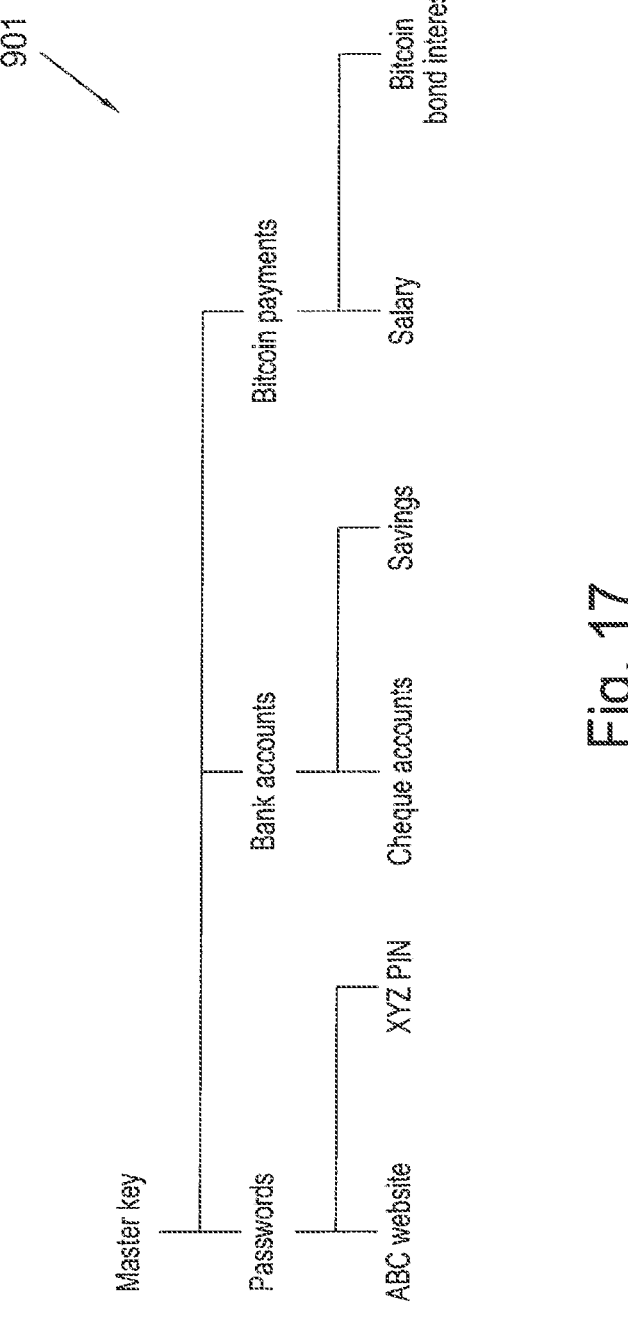

As well as a chain (linear) hierarchy as described above, a hierarchy in the form of a tree structure can be created. With a tree structure, a variety of keys for different purposes such as authentication keys, encryption keys, signing keys, payment keys, etc. may be determined whereby these keys are all linked to a single securely maintained master key. This is best illustrated in FIG. 17 that shows a tree structure 901 with a variety of different keys. Each of these can be used to create a shared secret with another party. Tree branching can be accomplished in several ways, three of which are described below.

(i) Master Key Spawning

In the chain hierarchy, each new 'link' (Public/Private key pair) is created by adding a multiply rehashed Message to the original master key. For example, (showing only the private key of the first node 3 for clarity):

$$V_{2C} = V_{1C} + \text{SHA-256}(M) \qquad \text{(Equation 24)}$$

$$V_{2C}' = V_{1C} + \text{SHA-256}(\text{SHA-256}(M)) \qquad \text{(Equation 25)}$$

$$V_{2C}'' = V_{1C} + \text{SHA-256}(\text{SHA-256}(\text{SHA-256}(M))) \qquad \text{(Equation 26)}$$

. . . and so on.

To create a branch, any key can be used as a sub-master key. For example $V_{2C}'$ can be used as a sub-master key ($V_{3C}$) by adding the hash to it as is done for the regular master key:

$$V_{3C} = V_{2C}' + \text{SHA-256}(M) \qquad \text{(Equation 27)}$$

The sub-master key ($V_{3C}$) may itself have a next generation key ($V_{3C}'$), for example:

$$V_{3C}' = V_{2C}' + \text{SHA-256}(\text{SHA-256}(M)) \qquad \text{(Equation 28)}$$

Figure 18:
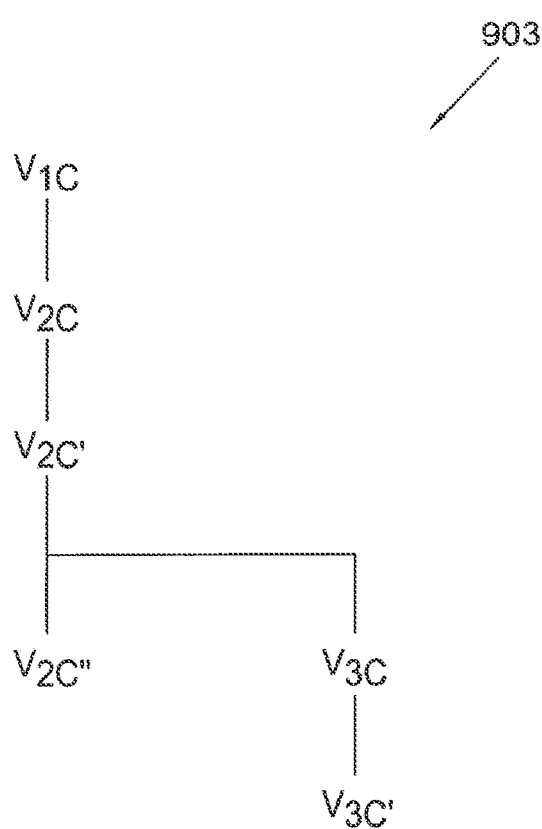

This provides a tree structure 903 using the master key spawning method as shown in FIG. 18.

(ii) Logical Association

In this method all the nodes in the tree (public/private key pairs) are generated as a chain (or in any other way) and the logical relationships between the nodes in the tree is maintained by a table in which each node in the tree is simply associated with its parent node in the tree using a pointer. Thus the pointer may be used to determine the relevant public/private key pairs for determining the common secret key (CS) for the session.

(iii) Message Multiplicity

New private/public key pairs can be generated by introducing a new message at any point in the chain or tree. The message itself may be arbitrary or may carry some meaning or function (e.g. it might be related to a 'real' bank account number, etc). It may be desirable that such new messages for forming the new private/public key pairs are securely retained.

Illustrative Computing Agent for Use with the Invention

The present invention can utilise a computing resource or agent to perform automated aspects of the contract process. An example of a suitable agent is provided below, although other implementations may be used.

The agent may operate in conjunction with the blockchain, using it as the non-erasable tape in the implementation of a Turing machine. This agent runs in parallel with the blockchain network, overseeing and handling the execution of a (looping) process. The looping process is designed to perform a given task such as, for example, the automation of a process or control of a device or system. This parallel resource monitors the state of the blockchain and can cause transactions to be written to the blockchain. In one sense, it utilises the Blockchain as a non-erasable tape of the Turing Machine, with the following definitions and features:

1. the Blockchain acts as the tape of the Turing Machine. Each transaction in the Blockchain represents a cell on the tape. This cell can contain symbols from a finite alphabet.
2. The tape head can read information from the blocks that have already been written onto the Blockchain.
3. The tape head can write new blocks, containing many transactions, to the end of the Blockchain. However, they cannot write onto blocks that already exist. As such, the Blockchain tape is non-erasable.
4. Metadata for each transaction can be stored as part of a multi-signature pay-to-script-hash (P2SH) transaction.

An important function of the agent is to act as an automated entity that monitors the current state of the Blockchain. It can also receive a signal or input from any off-block source. Depending on the Blockchain state and/or a received input, the agent may perform certain actions. The agent decides which action(s) are to be performed. These may or may not involve actions in the 'real world' (i.e. off block) and/or actions on the Blockchain (such as creating and broadcasting new transactions). The action that the agent takes may be triggered by the Blockchain state. The agent may also decide on the next set of transactions to be broadcast to the Bitcoin network, and subsequently written to the Blockchain.

The agent's action(s) run in parallel and simultaneously to the Blockchain (eg Bitcoin) network. In a sense, this extends the function of blockchain (eg Bitcoin) script. This continuous monitoring implements the 'loop' control-flow constructs making the combined agent and Blockchain system Turing Complete.

The Turing Machine includes two stacks:

Data stack: This is represented by the Blockchain as described above.

Control stack: This is represented by the agent function. This stores information relating to the repeat control-flow function.

The separation of the control stack from the data stack provides the advantage of preventing infinite loops from occurring within the Bitcoin core, mitigating denial-of-service attacks.

The agent manages and runs subroutines that are able to loop via any type of loop construct (e.g. FOR-NEXT; REPEAT UNTIL; etc). An illustrative embodiment described herein includes a process using one example of the 'repeat' construct. The user may specify the index (i) and the limit (J). These represent the current iteration number (typically counted starting from 0) and the total number of iterations of the repeat loop respectively.

For each iteration:

1. The Index increments by 1. For the exit condition, the iterations will stop when the index reaches the limit
2. A code block containing an "if condition then action" (ICTA) statement is executed; the action may be any action on or off the blockchain;
3. A cryptographic hash of this subroutine is computed. This can be stored in the Blockchain as part of a transaction. Since the hash is unique to each code, it will enable verification of which code has been used The body of the loop includes a code block. Each code block contains a "If condition then action" (ICTA) statement. This monitors the current state of the Blockchain for transactions matching the:

Start or triggering condition (e.g when a particular date is reached).

Repeat condition (i.e. a metadata or hash associated with the previous iteration).

Stop condition (i.e. last iteration of the loop).

The ICTA statement enables the agent to decide on the next transaction to make, based on the current state of the blockchain. Making the next transaction involves broadcasting the transaction onto the Bitcoin network, and writing the new transaction onto the Blockchain. This acts as a record that this iteration has been executed. Once the transaction has been written onto the Blockchain, the Manager will subsequently find that the previous iteration has been executed and written onto the Blockchain, and will execute the next iteration. The latter continues until the repeat loop exits when the index (i) reaches the limit (J) specified in the code block.

Each transaction is saved in the blockchain in a way that can be reused. In a Bitcoin implementation, each signature in a transaction is appended with a SIGHASH flag. This flag can take on different values, each indicating whether other parts of the transaction can be amended without involvement of the owner of this signature. A reusable transaction has the SIGHASH flag 'SigHash_AnyoneCanPay' in one of the transaction inputs. This permits anyone to contribute to the inputs of the transaction. This parameter enables the agent's ICTA function to be executed and repeated multiple times and with different inputs. Use of the function can be restricted to authorised parties—for example, via copyright of the reusable transaction.

The 'If condition' section of the ICTA code block can monitor any type of condition. This is similar to other programming languages (e.g. C, C++, Java) and not limited to information stored on the Blockchain. For example, it could monitor the date and time (i.e. when a certain date and time are reached) or monitor the weather (i.e. when the temperature is below 10° C. and it is raining), monitor the conditions of a contract or a trust (i.e. when company A buys company B).

The 'Then action' section of the ICTA code block can execute a number of actions. The invention is not limited with regard to the number or type of actions that can be taken. The action is not limited to a transaction on the Blockchain, although a transaction containing metadata related to the action may be written on the Blockchain.

The metadata can be of any form. However, in one embodiment, the metadata may store a hyperlink to a file containing more data or instructions relating to the action. The metadata may store both a hyperlink to a hash table containing more data or instructions relating to the action along with a hash of the action that acts as the loop-up key for the hash table.

The agent's control stack can be implemented in a number of ways that are specific to the needs of each user. For example, the repeat loop of the control stack can be based on any Turing Complete language. One possible choice of language is the Forth style stack-based language. An advantage of using this language is that it keeps the control stack consistent in programming style with the Bitcoin scripts which are already known and in wide usage.

Using the Bitcoin Script's Alternate Stack as a Data Storage Space

The Bitcoin script contains commands, also called op codes, which enable users to move data onto an alternative stack, known as the 'alt stack.'.

The op codes are:

OP_TOALTSTACK—which moves data from the top of the main stack onto the top of the alt stack.

OP_FROMALTSTACK—which moves data from the top of the alt stack to the top of the main stack.

This enables data from intermediate steps of calculations to be stored in the alt stack, similar to the 'memory' function which allows data to be stored on the calculator. In one embodiment, the alt stack is used for configuring bitcoin scripts to solve small computation tasks and returning the results in the computation.

Using a Code Register to Manage the Agent

The agent also manages a registry of all the codes that it owns and runs. This registry is structured like a lookup table or dictionary that maps a specific key to a specific value. The key and value pair is represented by the hash of the code block ($H_1$) and the IPv6 address of where the code is stored respectively. To retrieve the code block using the key $H_1$, the lookup table is used to retrieve the associated value (this is the location where the code is stored) and retrieves the source code accordingly. The implementation of the code registry can vary.

Transaction Metadata of the Agent's Code, and Re-Spawning of the Loop

Information required to respawn the agent's loop at a particular iteration is stored as metadata in the transaction recorded on the Blockchain.

In this way, a transaction on the blockchain stores or provides access to information about a given iteration of the loop which is being executed on the agent. This information can include the values of any variables associated with the loop, such as index i, and any other necessary information such as values for parameters used in the code block or location-related data specifying where further required information can be accessed.

The metadata itself is stored as part of a multi-signature pay-to-script-hash script (P2SH) in the transaction. The metadata recorded with the transaction also gives the ability to record an audit trail of how the code has been executed in the past.

There are several ways in which the agent could respawn the repeat loop code block at each iteration. The code block might be hard-coded into the agent itself, or could be stored in a private or publicly available file, or stored as an entry on a private or public hash table file, or a combination of the above. The code block could be static with hard-coded variables or could be static but contain parameter(s) that can be populated. The parameters could be single values of any data format, or could be small chunks of code, or be combinations of the above. The parameters could be populated by retrieving them directly from metadata in a transaction (e.g. bitcoin transaction) or from an external source such as an internal database or a private/public file or hash table or any combination of the above. Pointers to the external source of parameter values might be stored in metadata in a transaction.

The following steps provide one example of how the agent can respawn a repeat loop code block at the ith iteration. In this example, the code registry is a hash table whereby the hash values act as look-up keys for the table and are stored in metadata on transactions.

1. The agent monitors the Blockchain for transactions that contain hashes of the code block that matches entries in the code registry.
2. The agent finds a transaction that contains the corresponding hash ($H_1$).
3. The agent reads the 'Metadata-CodeHash', gets the CodeHash field to get $H_1$ and uses it to retrieve the code ($C_1$). If RIPEMD-160(SHA256($C_1$)) equals $H_1$, the code has not been changed and it is safe to proceed to the next step.
4. The agent reads the 'Metadata-CodeHash' which stores the index I, and respawns the code at the $i^{th}$ iteration. In other words, the loop is 'reloaded' at the appropriate iteration
5. The signature of the User is included in the P2SH command to verify the origin of the metadata.
6. The agent reads the 'Metadata-OutputHash' and 'Metadata-OutputPointer' to retrieve the output of the previous steps, if these data are required for this iteration of the loop.

SUMMARY

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method of controlling a transfer made via a blockchain in respect of an asset, the method implemented by a processing resource, the method comprising:

defining an asset comprising one or more private cryptographic keys, each private cryptographic key of the asset being associated with an owner of the asset;

generating a registry comprising at least one public cryptographic key, wherein each public key:

corresponds to a private cryptographic key in the one or more private cryptographic keys, and is associated with a redeem script hash that can be identified within an unspent blockchain transaction;

generating a smart contract comprising at least one rule relating to an automated generation of one or more blockchain transactions to enable a transfer of currency to be made in respect of the asset; and monitoring, at a master computing agent, a blockchain network by:

maintaining an off-chain unspent transaction output (UTXO) list comprising entries identifying unspent blockchain transactions associated with the asset;

monitoring a state of the blockchain to detect transactions associated with the asset; and updating the UTXO list based on the detected transactions associated with the asset to maintain the entries as reflecting a current ownership state of the asset;

determining current ownership of the asset from the registry and the unspent transaction output list to obtain a set of current owner identifiers;

generating, based on the obtained set of current owner identifiers, authorization data specifying which subordinate computing agents are authorized to execute operations for the smart contract;

transmitting the authorization data and the obtained set of current owner identifiers to one or more subordinate computing agents specified in the authorization data, wherein the master computing agent and the one or more subordinate computing agents form a hierarchy of computing agents;

at the one or more subordinate computing agents, responsive to the authorization from the master computing agent;

evaluating the at least one rule of the smart contract to determine required blockchain transactions;

processing income defined by the smart contract by calculating individual payments across current ownership of the asset based on payment rules defined within the smart contract;

executing smart contract-required cost transactions by calculating individual cost allocations across current ownership of the asset based on payment rules defined within the smart contract;

consolidating smart contract income from multiple payments payment transactions from multiple individual transactions where payment addresses match;

generating and transmitting an alert to an owner of the asset providing notification about an event relating to the asset;

constructing a blockchain transaction according to the at least one rule of the smart contract by incorporating payment instructions or transaction requests, wherein inputs and outputs of the blockchain transaction include a reference to the blockchain addresses associated with the obtained set of current owner identifiers; and broadcasting the constructed blockchain transaction to the blockchain network.

2. The method of claim 1, wherein the at least one rule provided in the smart contract defines a payment schedule associated with the asset.

3. The method of claim 1, wherein the smart contract is stored in a Distributed Hash Table, and a hash of the contract is provided within metadata associated with a blockchain transaction.

4. The method of claim 1, wherein at least one transaction of the one or more blockchain transactions includes metadata.

5. The method of claim 4, wherein the metadata is indicative of:

i) an amount of shares available under the contract;

ii) a quantity of transfer units to be transferred from a sender to at least one recipient; and iii) a factor for calculating a value for the quantity of transfer units.

6. The method of claim 1, wherein metadata for each transaction can be stored as part of a multi-signature pay-to-script-hash (P2SH) transaction.

7. The method of claim 4, wherein the metadata stores a hyperlink to a file containing more data or instructions.

8. The method of claim 7, wherein the metadata stores both a hyperlink to a hash table containing more data or instructions relating to an action along with a hash of the action that acts as a look-up key for the hash table.

9. A system comprising:

a non-transitory memory storing machine readable instructions; and a processor that access the memory and executes the machine readable instructions, the machine readable instructions, when executed cause the processor to execute operations, the operations comprising:

defining an asset comprising one or more private cryptographic keys, each private cryptographic key of the asset being associated with an owner of the asset;

generating a registry comprising at least one public cryptographic key, wherein each public key:

corresponds to a private cryptographic key in the one or more private cryptographic keys, and is associated with a redeem script hash that can be identified within an unspent blockchain transaction;

generating a smart contract comprising at least one rule relating to an automated generation of one or more blockchain transactions to enable a transfer of currency to be made in respect of the asset; and monitoring, at a master computing agent, a blockchain network by:

maintaining an off-chain unspent transaction output (UTXO) list comprising entries identifying unspent blockchain transactions associated with the asset;

monitoring a state of the blockchain to detect transactions associated with the asset; and updating the UTXO list based on the detected transactions associated with the asset to maintain the entries as reflecting a current ownership state of the asset;

determining current ownership of the asset from the registry and the unspent transaction output list to obtain a set of current owner identifiers;

generating, based on the obtained set of current owner identifiers, authorization data specifying which subordinate computing agents are authorized to execute operations for the smart contract;

transmitting the authorization data and the obtained set of current owner identifiers to one or more subordinate computing agents specified in the authorization data, wherein the master computing agent and the one or more subordinate computing agents form a hierarchy of computing agents;

at the one or more subordinate computing agents, responsive to the authorization from the master computing agent:

evaluating the at least one rule of the smart contract to determine required blockchain transactions;

processing income defined by the smart contract by calculating individual payments across current ownership of the asset based on payment rules defined within the smart contract;

executing smart contract-required cost transactions by calculating individual cost allocations across current ownership of the asset based on payment rules defined within the smart contract;

consolidating smart contract income from multiple payments payment transactions from multiple individual transactions where payment addresses match;

generating and transmitting an alert to an owner of the asset providing notification about an event relating to the asset;

constructing a blockchain transaction according to the at least one rule of the smart contract by incorporating payment instructions or transaction requests, wherein inputs and outputs of the blockchain transaction include a reference to the blockchain addresses associated with the obtained set of current owner identifiers; and broadcasting the constructed blockchain transaction to the blockchain network.

* * * * *